April 30, 1963 M. S. DE LAY 3,087,741
LOAD-EQUALIZING DEVICE FOR TRAILERS
Filed Aug. 24, 1960 15 Sheets-Sheet 1

INVENTOR.
MANFORD S. DE LAY
BY
ATTORNEY

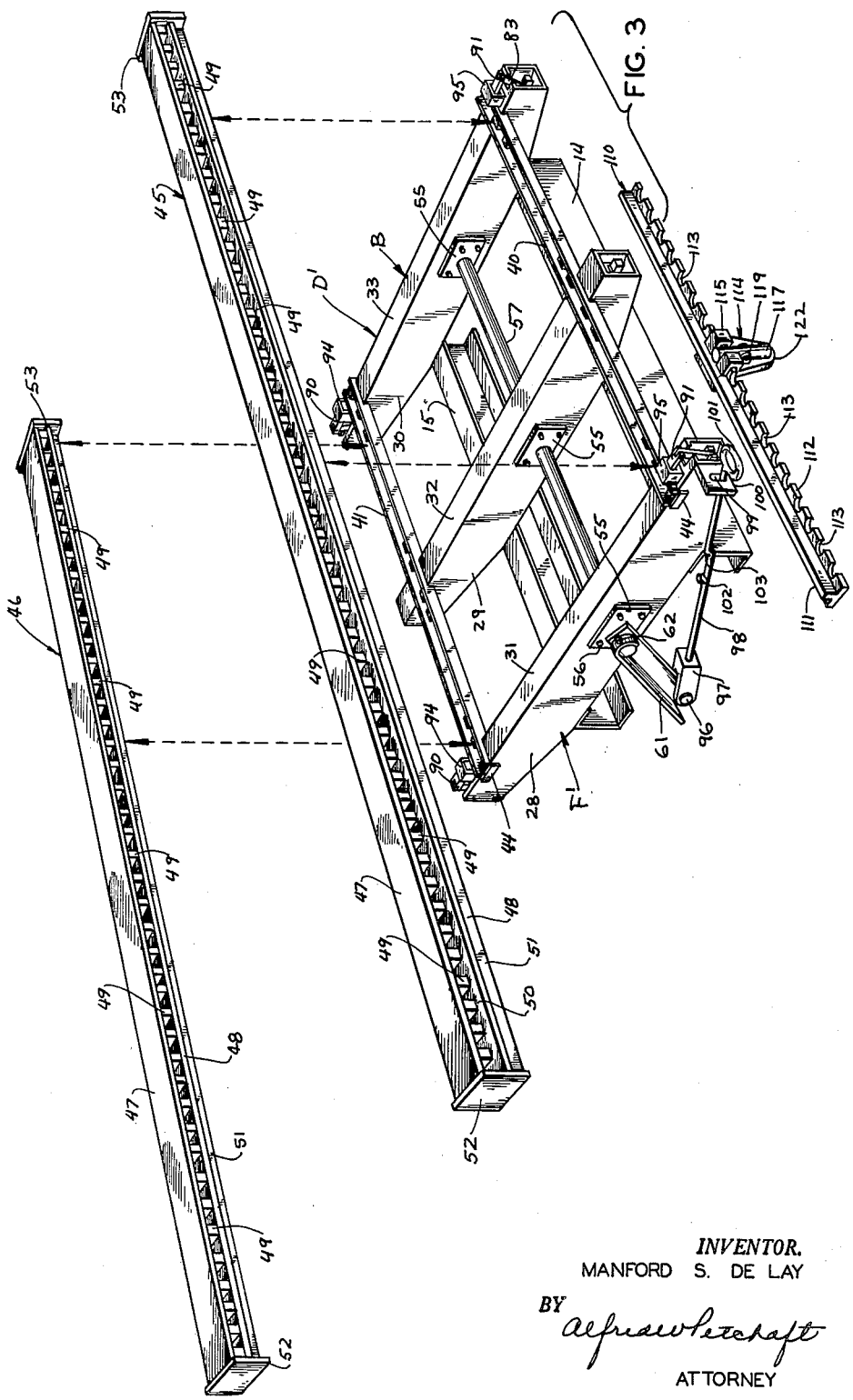

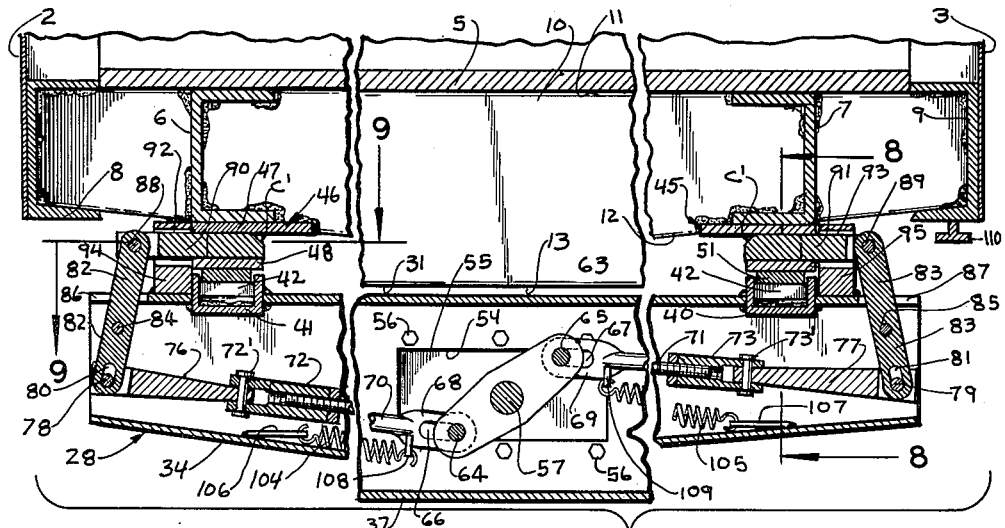
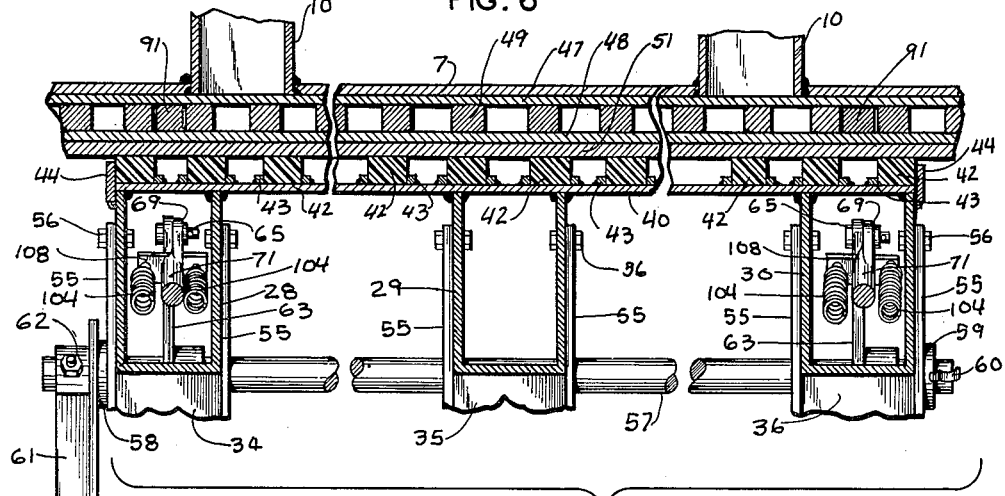
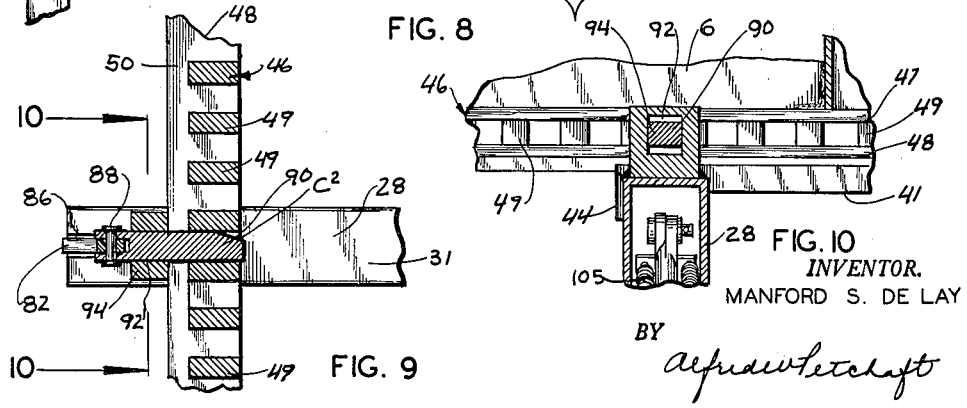

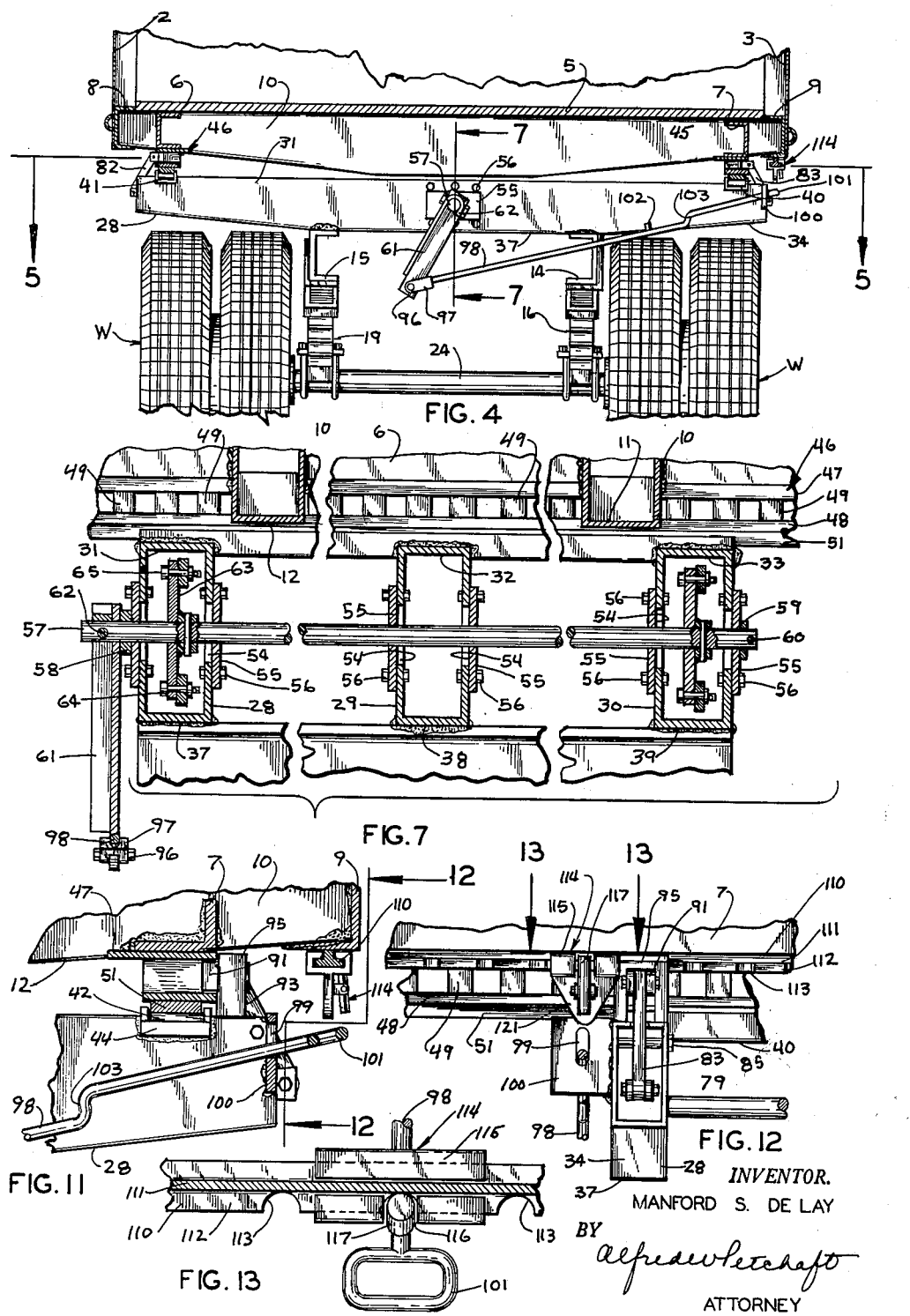

April 30, 1963 — M. S. DE LAY — 3,087,741
LOAD-EQUALIZING DEVICE FOR TRAILERS
Filed Aug. 24, 1960 — 15 Sheets-Sheet 5

INVENTOR.
MANFORD S. DE LAY
BY
ATTORNEY

April 30, 1963 M. S. DE LAY 3,087,741
LOAD-EQUALIZING DEVICE FOR TRAILERS
Filed Aug. 24, 1960 15 Sheets-Sheet 6
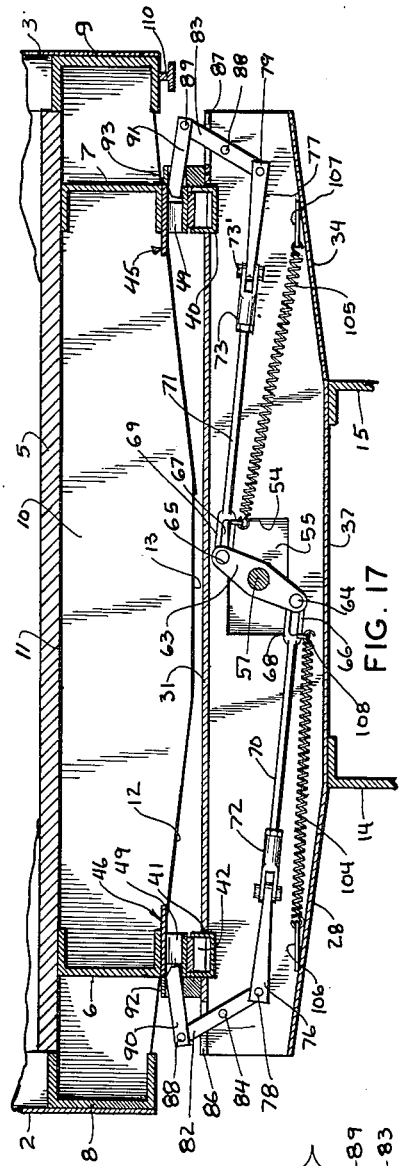
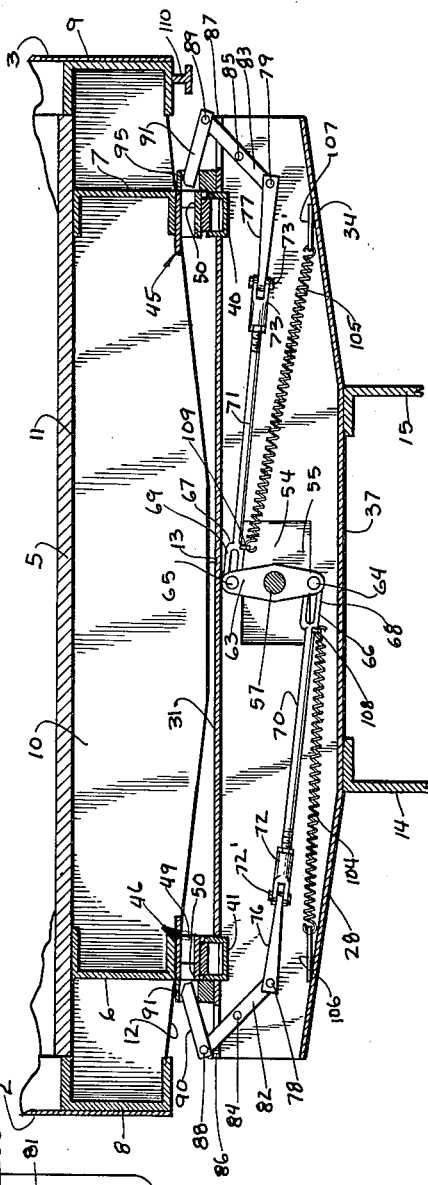
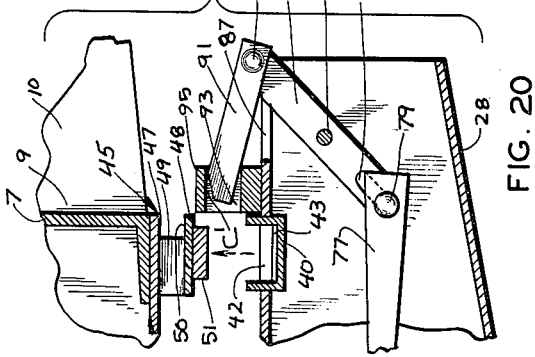
INVENTOR.
MANFORD S. DE LAY
BY
ATTORNEY April 30, 1963  M. S. DE LAY  3,087,741
LOAD-EQUALIZING DEVICE FOR TRAILERS
Filed Aug. 24, 1960  15 Sheets-Sheet 7
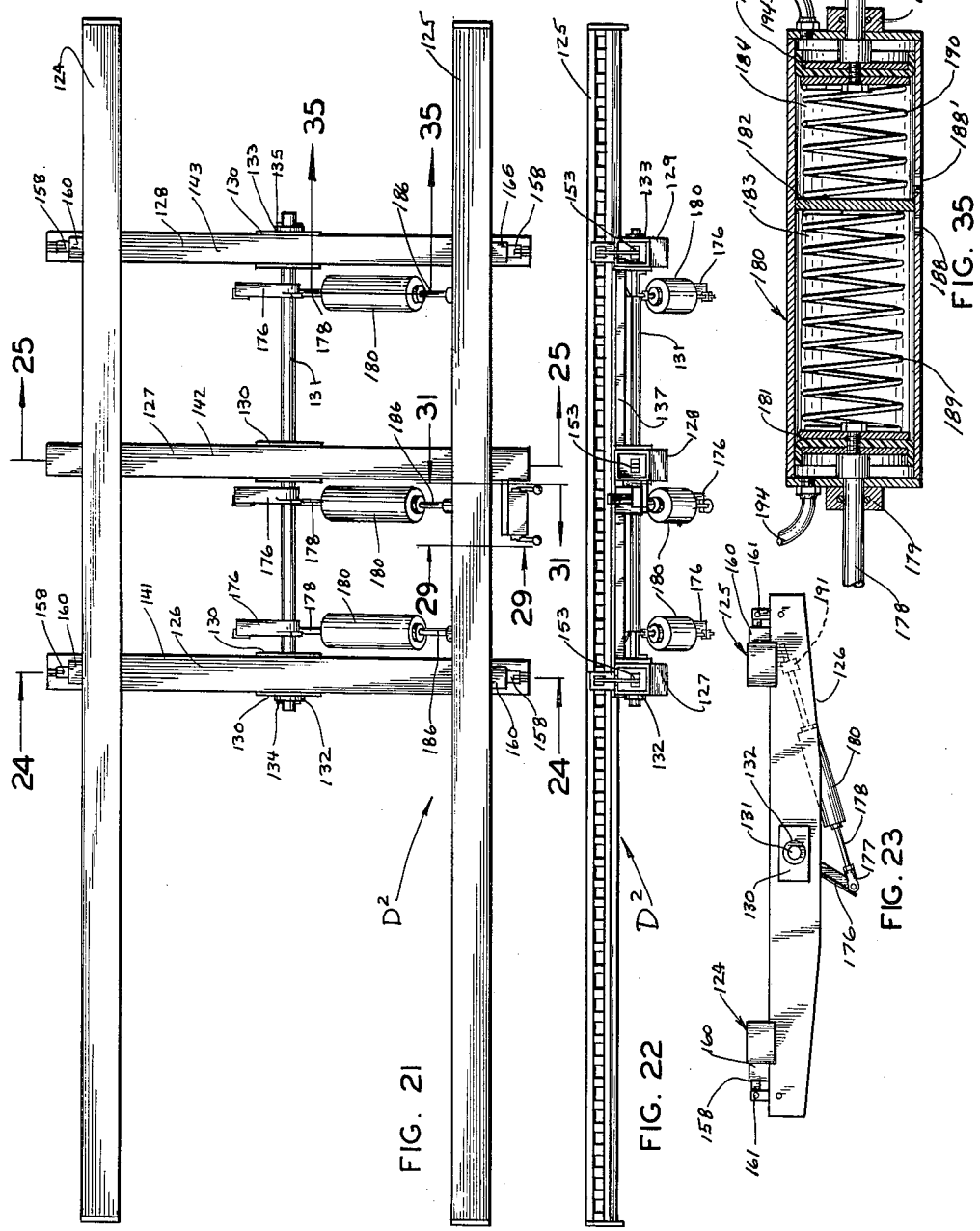
INVENTOR.
MANFORD S. DE LAY
BY
ATTORNEY April 30, 1963 M. S. DE LAY 3,087,741
LOAD-EQUALIZING DEVICE FOR TRAILERS
Filed Aug. 24, 1960 15 Sheets-Sheet 8

INVENTOR.
MANFORD S. DE LAY
BY
ATTORNEY

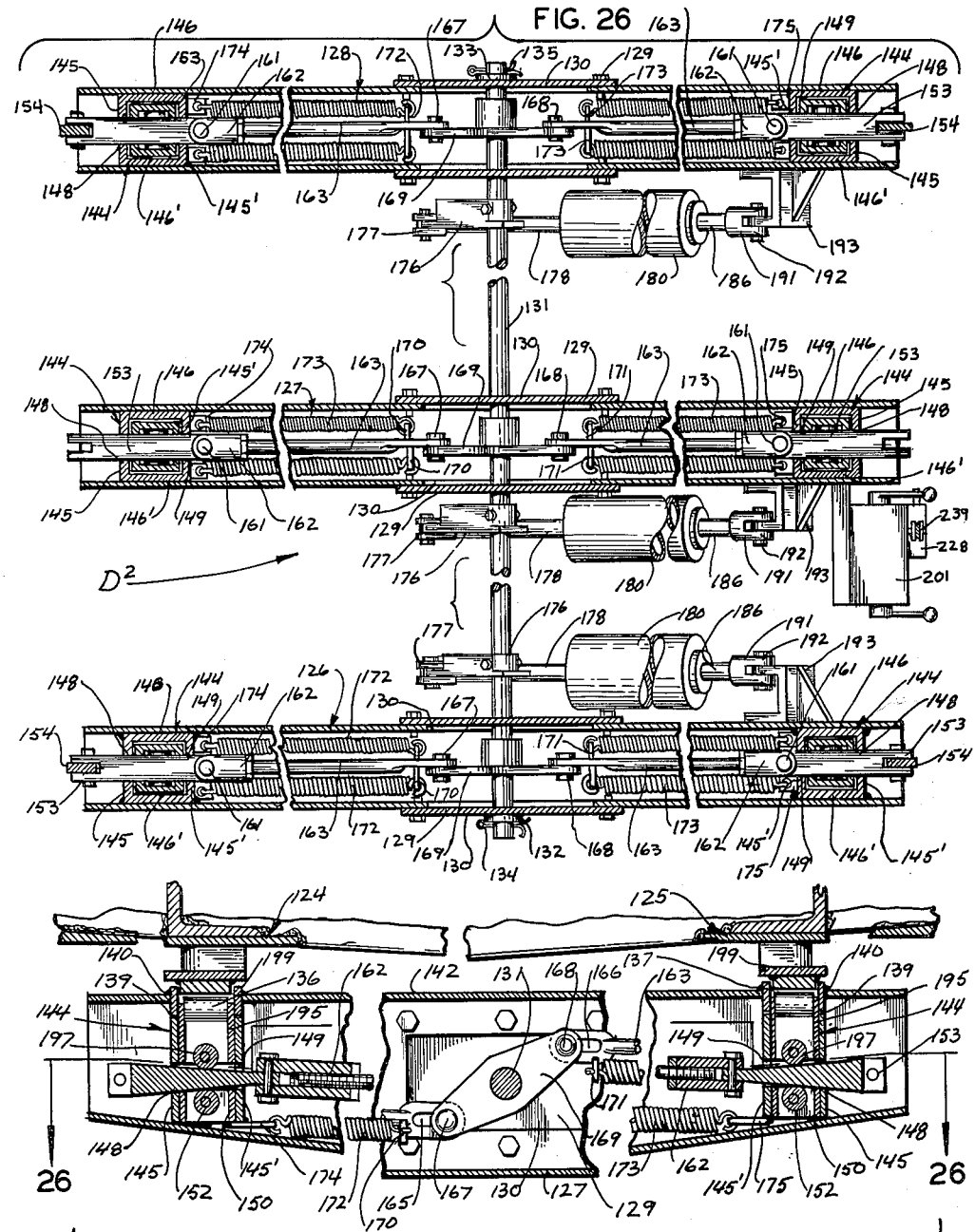

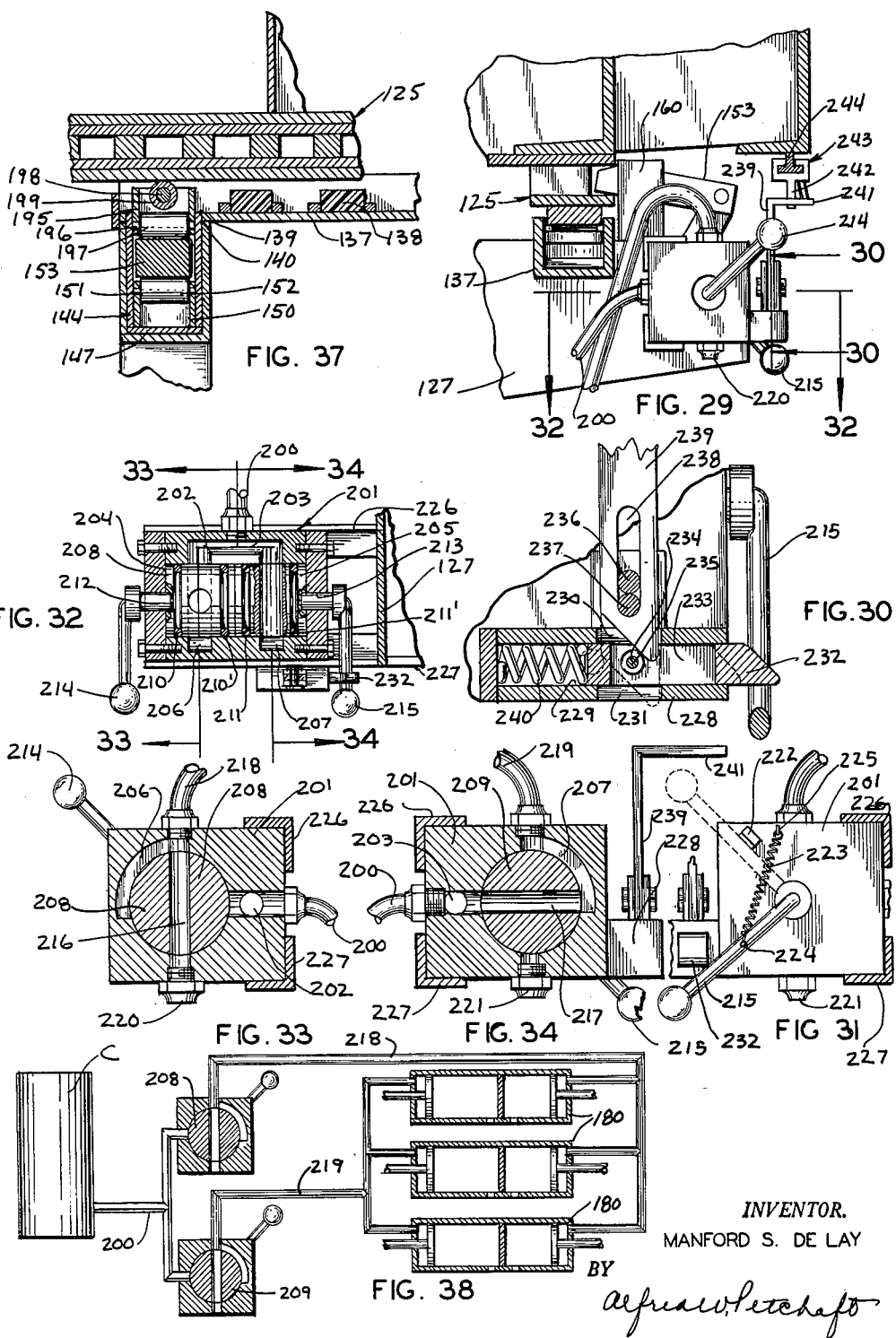

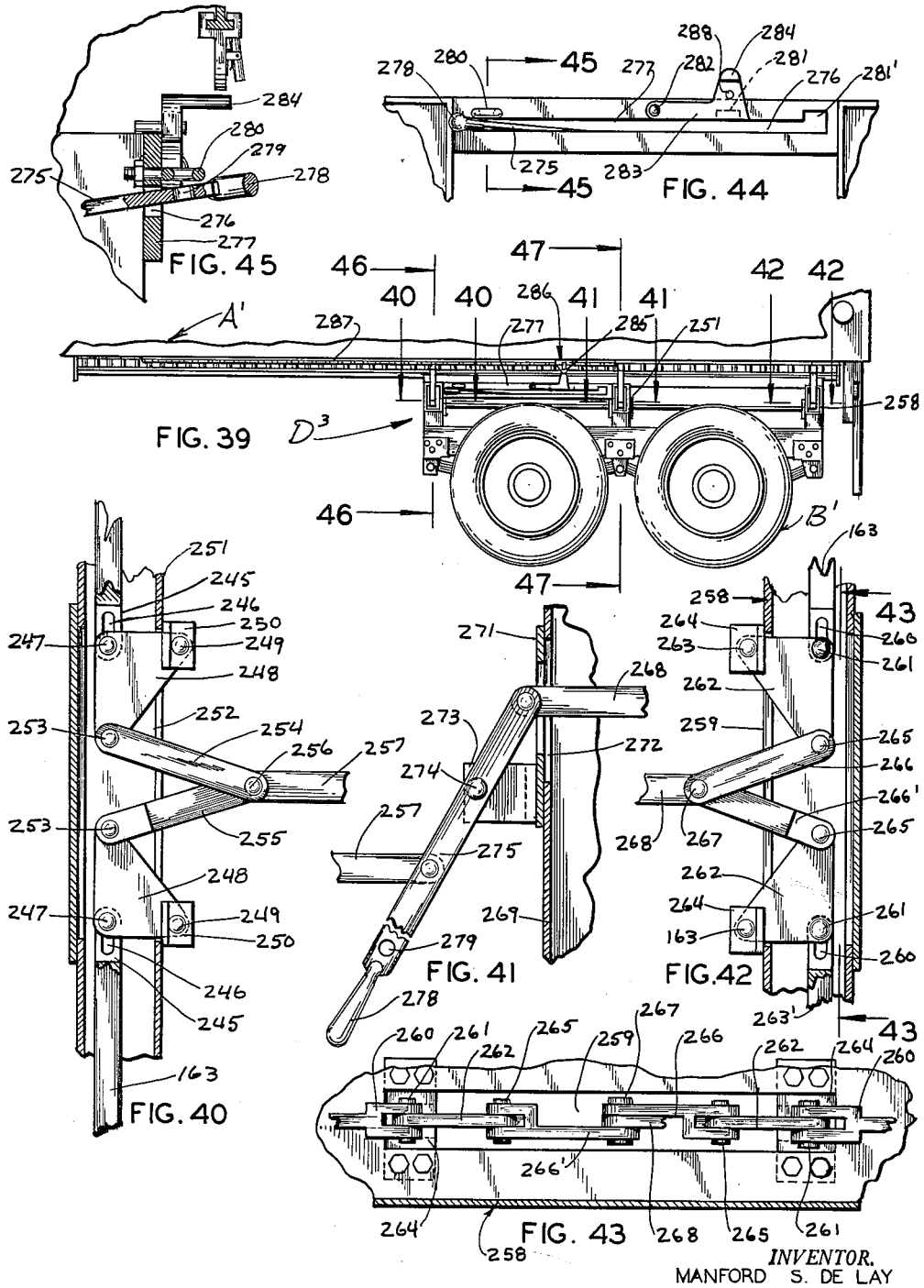

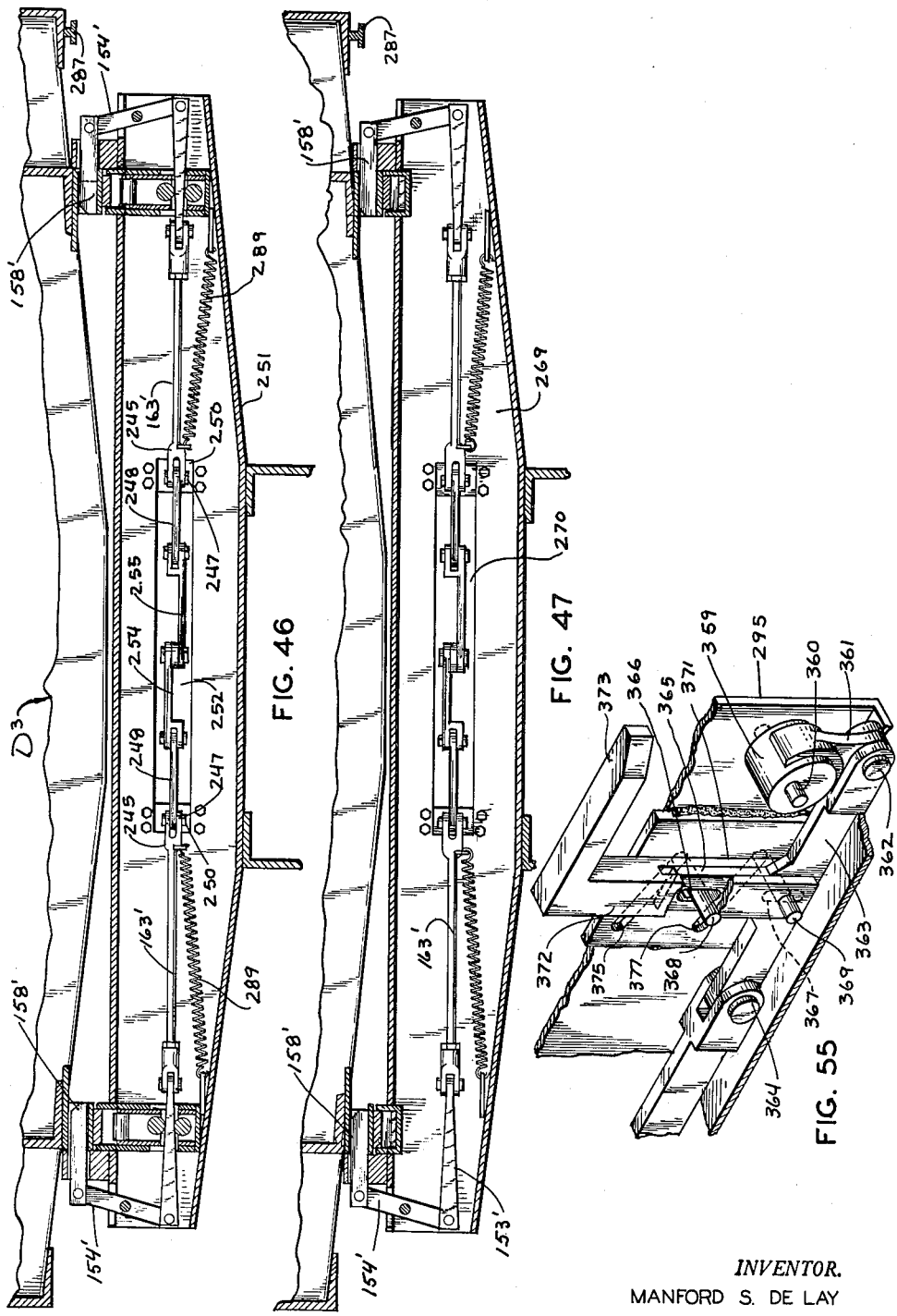

April 30, 1963  M. S. DE LAY  3,087,741
LOAD-EQUALIZING DEVICE FOR TRAILERS
Filed Aug. 24, 1960  15 Sheets-Sheet 13
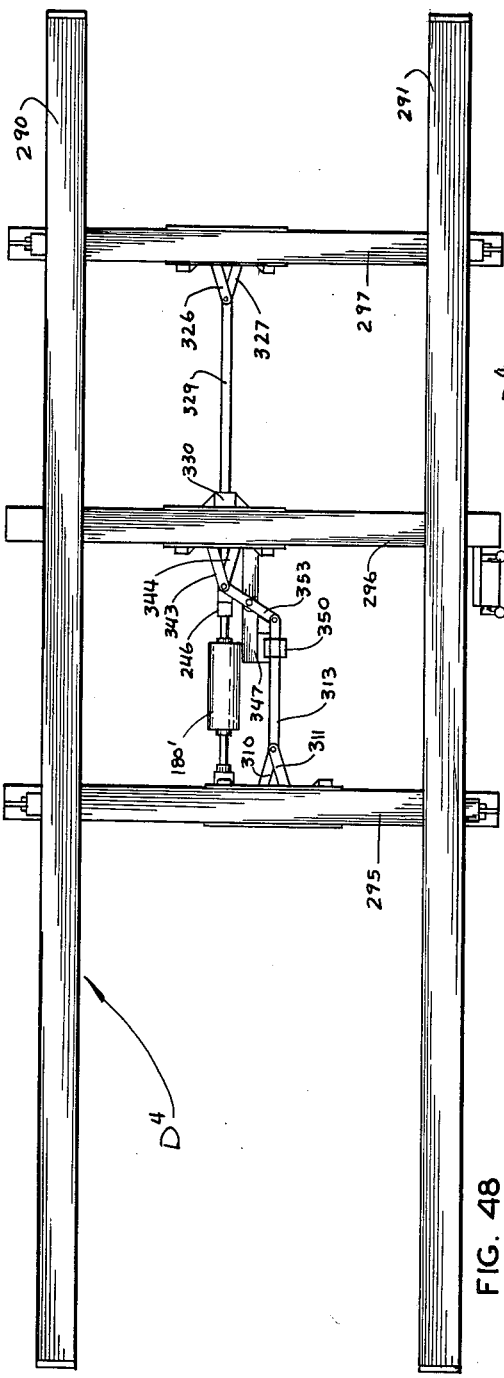
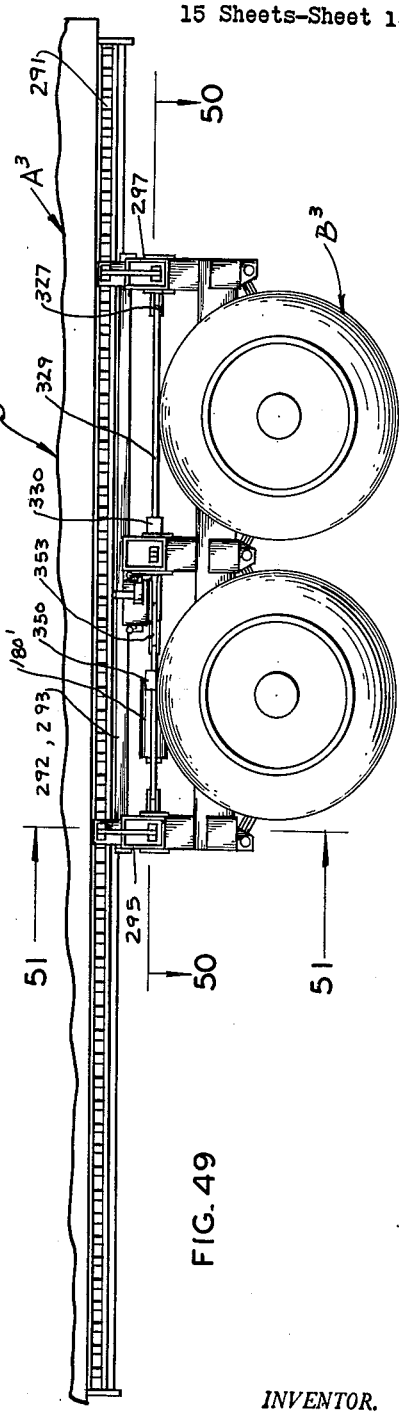
INVENTOR.
MANFORD S. DE LAY
BY
ATTORNEY

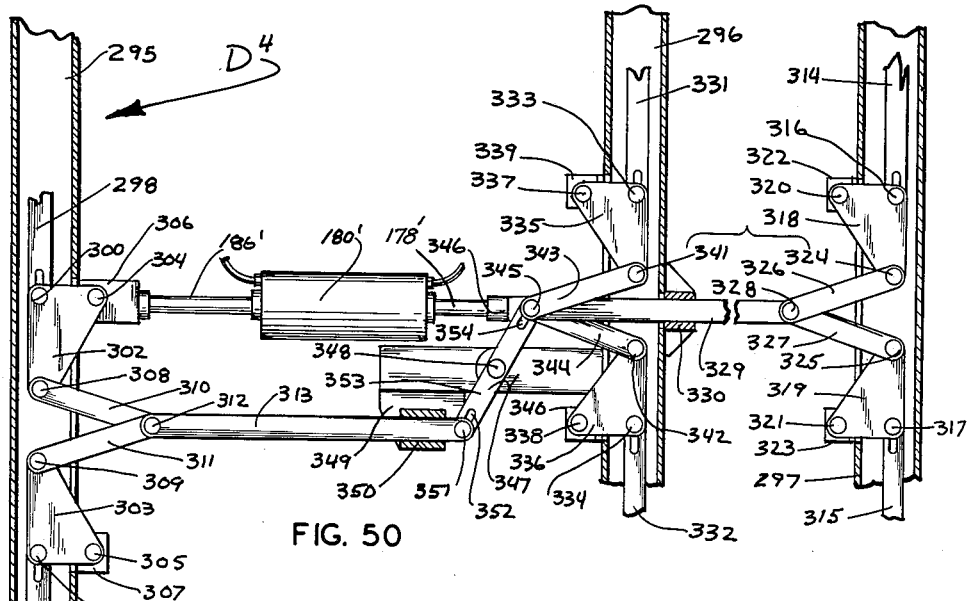
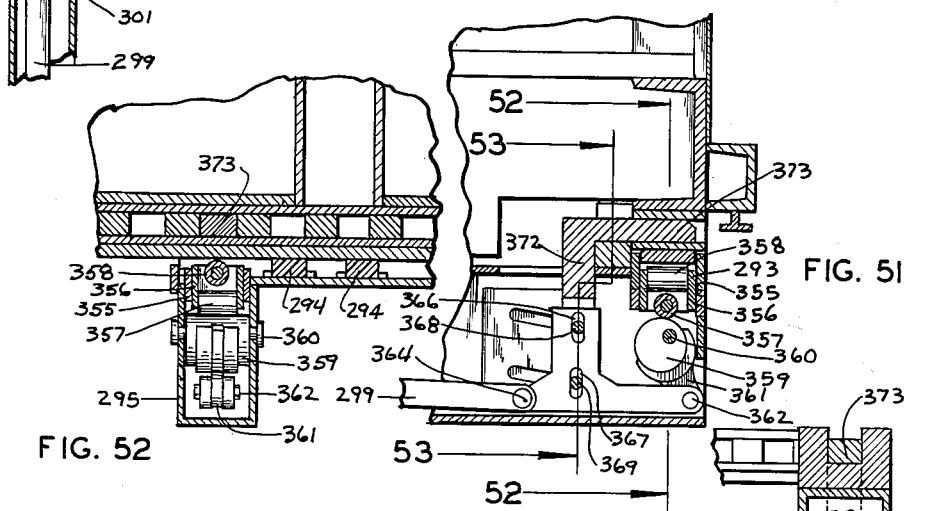
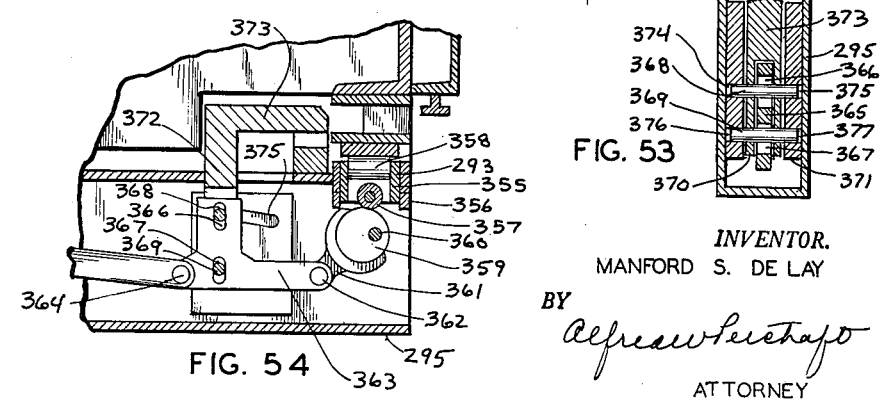

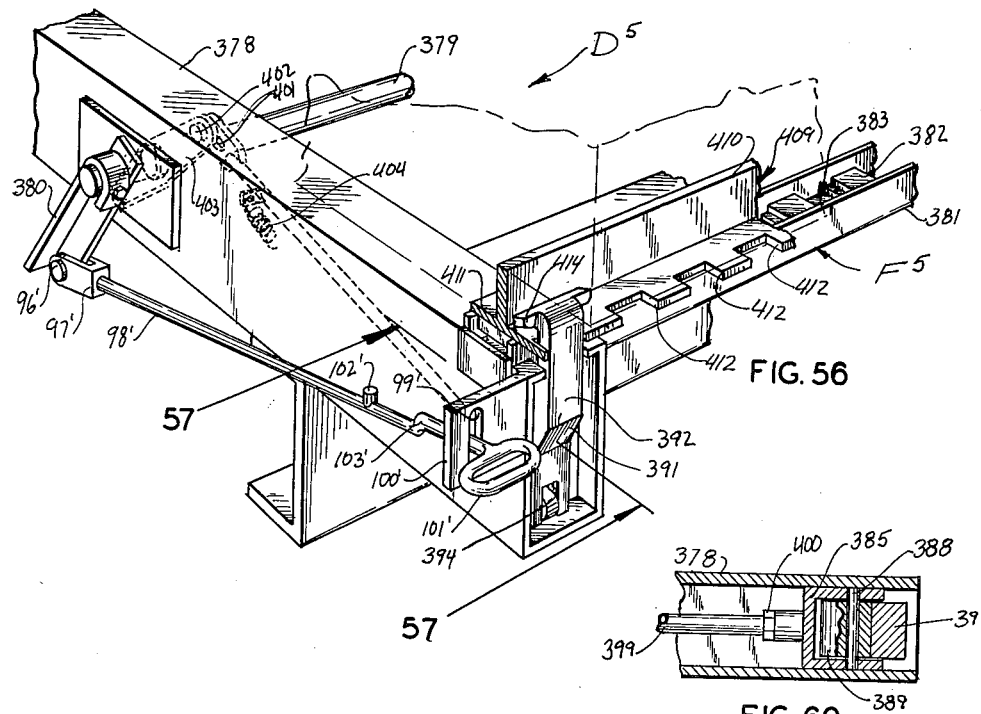
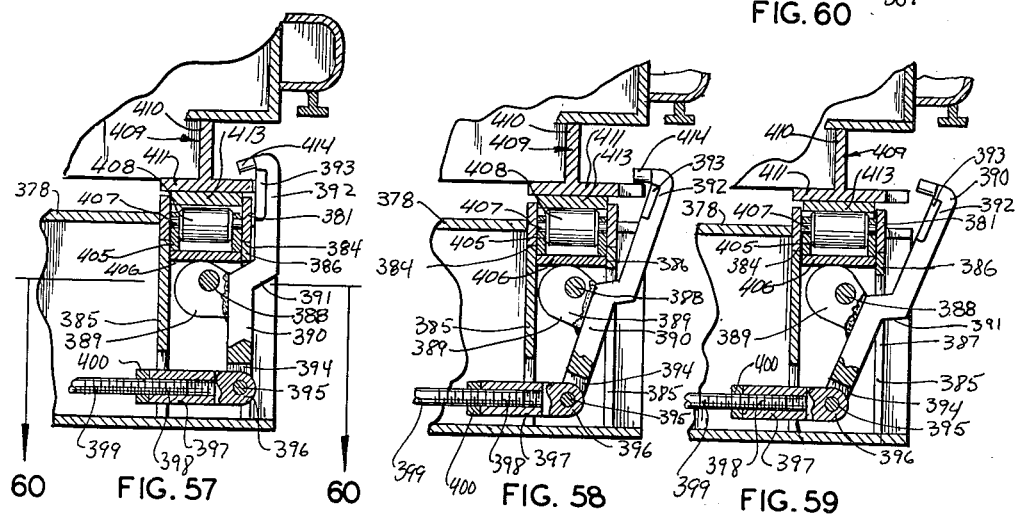

United States Patent Office 3,087,741
Patented Apr. 30, 1963

3,087,741
LOAD-EQUALIZING DEVICE FOR TRAILERS
Manford S. De Lay, St. Louis County, Mo., assignor of 21$^{55}/_{100}$ percent to Robert B. Meihaus, Warrenton, Mo., and 21$^{55}/_{100}$ percent to Glennon T. Moran, St. Louis, Mo.
Filed Aug. 24, 1960, Ser. No. 51,589
17 Claims. (Cl. 280—81)

This invention relates in general to certain new and useful improvements in load-carrying vehicles, such as tractor-trailer trucks, and relates, more particularly, to load-equalizing devices by which the truck-body can be adjustably connected to the running gear.

In recent years, the volume of freight traffic carried by so-called over-the-road trucks has increased tremendously and this has lead to wide variations in the nature and character of loads which may be carried by any particular truck or tractor-trailer unit from time to time. Consequently, it is impossible to establish a single fixed distance between the front running gear and the rear running gear of such a unit which will create equal distribution of all loads. It has, therefore, become the practice in the trucking industry to provide truck-bodies and trailer bodies with longitudinally adjustable horizontal slides which may be mounted either at the front end of the body adjacent to the fifth wheel or at the rear end of the body adjacent to the rear-axle tandem, as shown, for example, in United States Letters Patents Nos. Re.–23,704, 2,818,272, and 2,900,194.

Load-equalizing devices which have been heretofore developed, however, are for the most part mounted inside the wheels. That is to say, the transverse distance between the rails forming the longitudinal slides is somewhat less than the transverse distance between the innermost pairs of tires in the rear-axle tandem assembly. Recently, it has become the practice to design rear-axle assemblies with cross rails that extend practically the entire width of the underside of the trailer or truck-body. As a result, a need has arisen for a load-equalizing device in which the longitudinally sliding rails can be mounted at the outer extremities of the cross rails of the rear-axle tandem assembly, or, in other words, adjacent to the outer extremities of the trailer or truck-body. Such load-equalizing devices have come to be referred to in the industry as "outside rails." Present available outside rails, however, have numerous disadvantages. The slide elements are perforated with a plurality of apertures adapted to receive locking pins and this arrangement has proven to be structurally weak when subjected to the wracking and torsional stresses of over-the-road hauling. Moreover, presently available devices do not make adequate provision for underbody clearances when the truck-body is removed from the tandem and fifth-wheel for so-called "pig-a-back" transportation on a railway flatcar, harbor ferry, or freighter.

It is, therefore, the primary object of the present invention to provide an outside rail which is strong, durable, and efficient in operation.

It is also an object of the present invention to provide an outside rail in which the load may be supported on a plurality of slide-elements which are lubricated from a plurality of built-in "grease pockets" so that load-equalizing adjustment can be easily and smoothly effected.

It is another object of the present invention to provide a load-equalizing device in which the trailer or truck-body may be elevated upon rollers in order that longitudinal adjustment may be effected easily and conveniently.

It is a further object of the present invention to provide a load-equalizing device of the type stated having a large number of relatively small increments of longitudinal adjustment without sacrificing the vertical load-supporting strength of the sliding rail structure.

It is an additional object of the present invention to provide a load-equalizing device of the outside rail type which may be readily adapted to and mounted upon various different types of rear-axle tandem assemblies and truck or trailer bodies.

It is also an object of the present invention to provide a load-equalizing device of the type stated having means for locking the trailer or truck-body in any desired position of longitudinal adjustment and having manually settable pre-selector means associated with the locking means whereby the locking means can be held in withdrawn or unlocked position while a particular longitudinal adjustment is being made and automatically returned to locked position when a selected position of longitudinal adjustment is reached.

It is a further object of the present invention to provide a load-equalizing device of the type stated having locking means which may be partially withdrawn from locked position in order to permit longitudinal adjustment while retaining the slide-elements in assembled relation and can also be fully withdrawn from locked position so that the trailer or truck-body can be entirely separated from the rear-axle tandem assembly, if desired.

It is also an object of the present invention to provide a load-equalizing device of the type stated in which the elements mounted upon the underside of the truck-body are located even with or slightly above the level of the body-sills and other under-structure so as to provide adequate under-body clearance for purposes of "pig-a-back" operations; that is to say, the slide-elements on the underside of the body will not interfere with setting the body down upon a platform, such as the floor of a flatcar or the deck of a boat when the body is entirely removed from the tandem rear-axle and tractor.

It is, likewise, an object of the present invention to provide a load-equalizing device of the type stated which may be readily adapted either for manual or power-actuated operation.

It is also another object of the present invention to provide a load-equalizing device of the type stated in which the locking means and load-elevating means are adapted for simultaneous operation so that, as the locking means is withdrawn from locked position, the load will be lifted upon rollers or other similar antifriction means which will facilitate longitudinal shifting or adjustment.

It is also an object of the present invention to provide a load-equalizing device so designed that it can be readily furnished to the user in several different forms by the mere addition or omission or standardized components or, in other words, can be supplied with simple longitudinal sliding adjustment means and can also be modified by the addition of standardized parts so as to include means for elevating the load upon rollers or similar bearing elements so that the longitudinal adjustment can be effected thereby and finally can be furnished with or without power-driven actuating means for elevating the load and effecting load-equalizing adjustments.

With the above and other objects in view, my invention resides in the novel features of form, construction, arrangement, and combination of parts presently described and pointed out in the claims.

In the accompanying drawings—

FIG. 3 is an exploded perspective view of a load-equalizing device constructed in accordance with and embodying the present invention;

FIG. 4 is a fragmentary transverse sectional view taken along line 4—4 of FIG. 1;

FIG. 6 is a fragmentary transverse sectional view taken along line 6—6 of FIG. 5;

FIG. 7 is a fragmentary sectional view taken along line 7—7 of FIG. 4;

Figures 1, 2, 14:
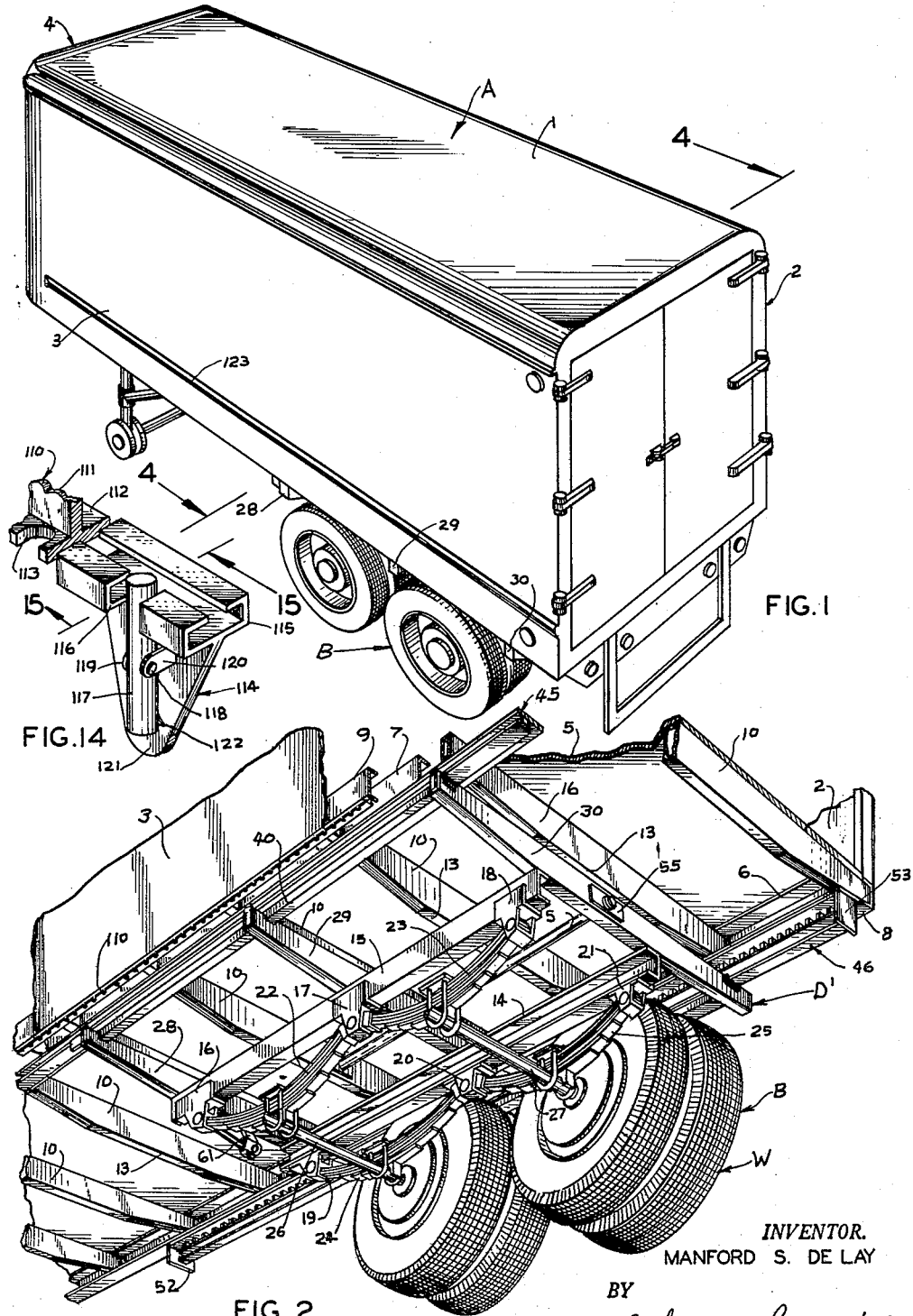
FIG. 1 is a perspective view of a truck-body of the so-called over-the-road trailer-type and a tandem rear-axle adjustably mounted on the underside thereof by means of a load-equalizing device constructed in accordance with and embodying the present invention.
FIG. 2 is a fragmentary perspective view of the underside of the truck-body shown in FIG. 1, illustrating in more particular detail the load-equalizing device of the present invention.
Figure 5:
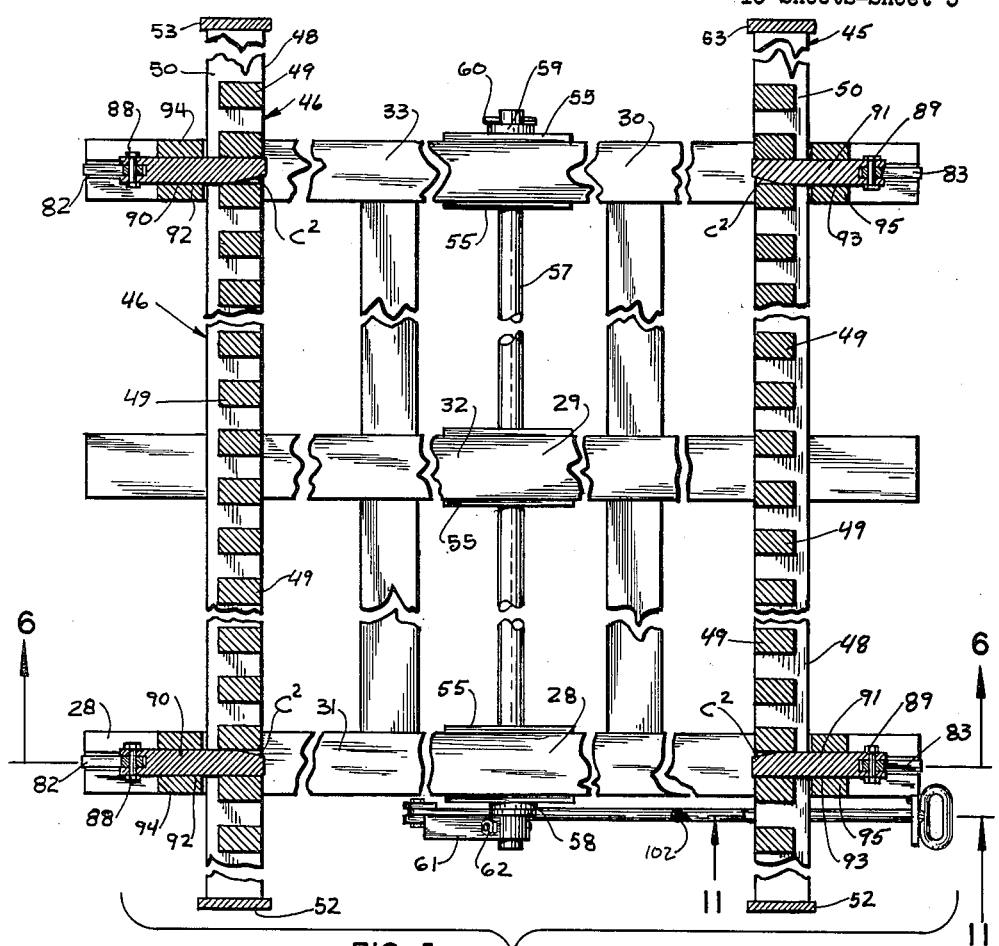
FIG. 5 is a fragmentary horizontal sectional view taken along line 5—5 of FIG. 4.
Figures 15, 16, 18:
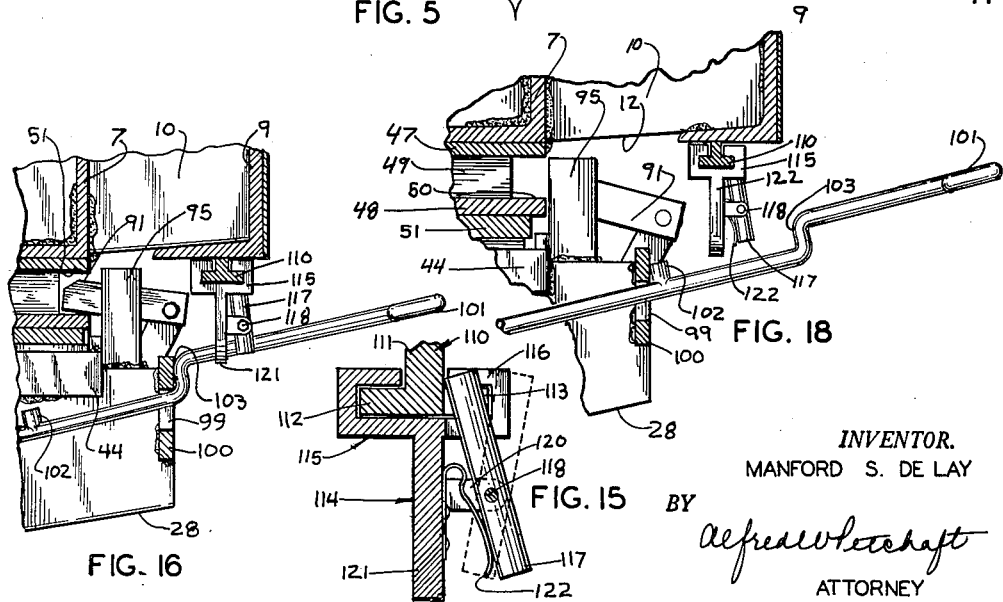
Figure 24:
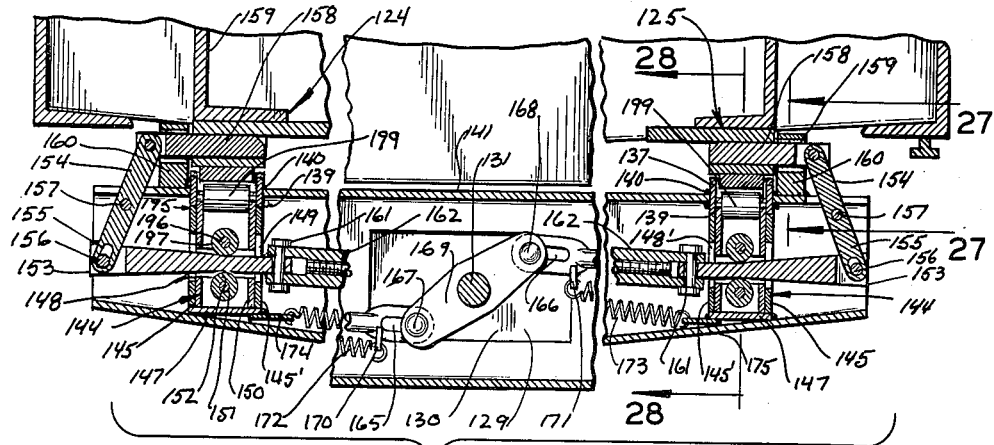
Figure 27:
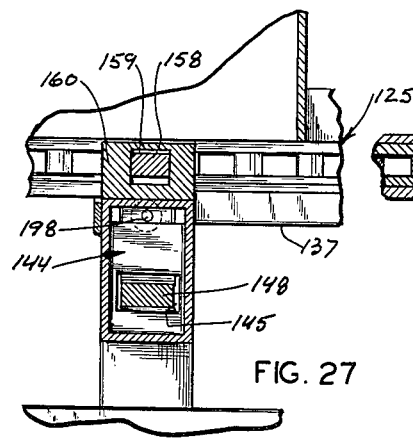
Figure 28:
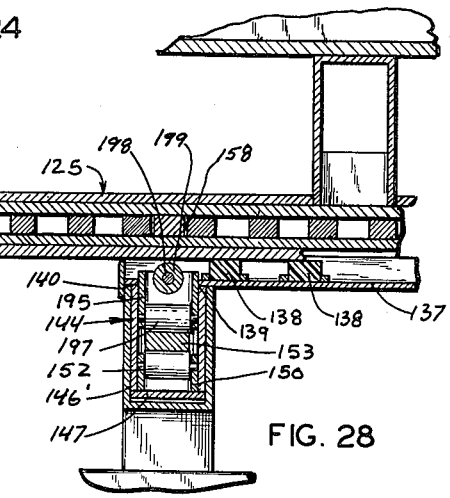
Figure 36:
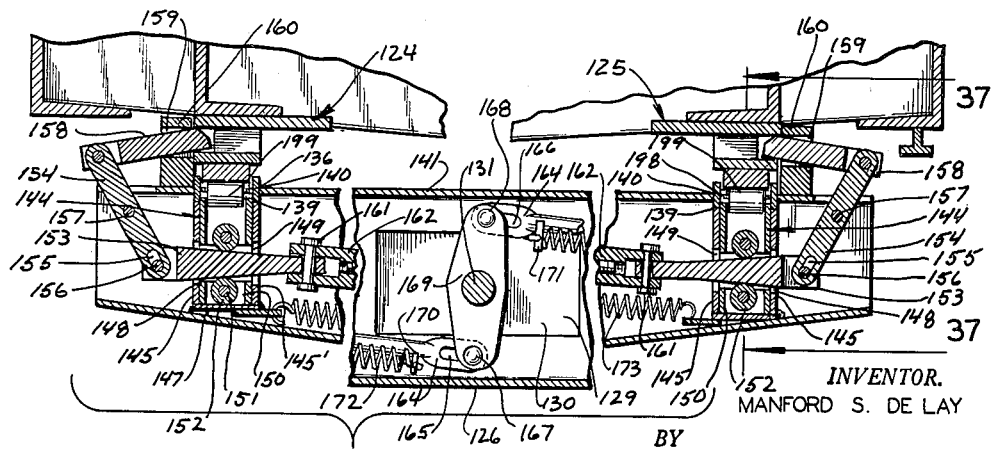

FIGS. 8 and 9 are fragmentary sectional views taken along lines 8—8 and 9—9, respectively, of FIG. 6;

FIG. 10 is a fragmentary sectional view taken along line 10—10 of FIG. 9;

FIG. 11 is a fragmentary sectional view taken along line 11—11 of FIG. 5;

FIG. 12 is a fragmentary sectional view taken along line 12—12 of FIG. 11;

FIG. 13 is a fragmentary sectional view taken along line 13—13 of FIG. 12;

FIG. 14 is a fragmentary perspective view, partly broken away and in section, of the preselector actuating cam forming a part of the present invention;

FIG. 15 is a fragmentary sectional view taken along line 15—15 of FIG. 14;

FIG. 16 is a fragmentary sectional view similar to FIG. 11, showing the reset handle in one alternative position;

FIG. 17 is a fragmentary transverse sectional view similar to FIG. 6, showing the locking pins in the position corresponding to the position of the reset handle shown in FIG. 16;

FIG. 18 is a fragmentary sectional view similar to FIG. 11, showing the reset handle in completely withdrawn position;

FIG. 19 is a fragmentary transverse sectional view similar to FIG. 6, showing the locking pins in the position corresponding to the position of the reset handle shown in FIG. 18;

FIG. 20 is an enlarged fragmentary sectional view of the locking pins and slide-elements in completely disengaged position;

FIG. 21 is a top plan view of a modified form of load-equalizing device constructed in accordance with and embodying the present invention;

FIG. 22 is a side elevational view of the modified form of load-equalizing device shown in FIG. 21;

FIG. 23 is an end elevational view of the modified form of load-equalizing device shown in FIG. 21;

FIGS. 24 and 25 are transverse sectional views taken along lines 24—24 and 25—25, respectively, of FIG. 21;

FIG. 26 is a fragmentary horizontal sectional view taken along line 26—26 of FIG. 25;

FIGS. 27, and 28 are fragmentary sectional views taken along lines 27—27 and 28—28, respectively, of FIG. 24;

FIG. 29 is a fragmentary sectional view taken along line 29—29 of FIG. 21;

FIG. 30 is a fragmentary sectional view taken along line 30—30 of FIG. 29;

FIG. 31 is a fragmentary sectional view taken along line 31—31 of FIG. 21;

FIG. 32 is a fragmentary sectional view taken along line 32—32 of FIG. 29;

FIGS. 33 and 34 are fragmentary sectional views taken along lines 33—33 and 34—34, respectively, of FIG. 32;

FIG. 35 is a fragmentary sectional view taken along line 35—35 of FIG. 21;

FIG. 36 is a fragmentary transverse sectional view similar to FIG. 24 showing the locking pins in partly withdrawn position to permit longitudinal adjustment of the load-equalizing device;

FIG. 37 is a fragmentary sectional view taken along line 37—37 of FIG. 36;

FIG. 38 is a schematic or diagrammatic view showing the pneumatic circuit for operating the pneumatic cylinder shown in FIG. 35;

FIG. 39 is a fragmentary side elevational view of another modified form of load-equalizing device constructed in accordance with and embodying the present invention;

FIGS. 40, 41, and 42, are fragmentary sectional views taken along lines 40—40, 41—41, and 42—42, respectively, of FIG. 39;

FIG. 43 is a fragmentary sectional view taken along line 43—43 of FIG. 42;

FIG. 44 is an enlarged fragmentary side elevational view of the reset mechanism forming a part of the present invention;

FIG. 45 is a fragmentary sectional view taken along line 45—45 of FIG. 44;

FIGS. 46 and 47 are fragmentary transverse sectional views taken along lines 46—46 and 47—47, respectively, of FIG. 39;

FIG. 48 is a top plan view of a further modified form of load-equalizing device constructed in accordance with and embodying the present invention;

FIG. 49 is a side elevational view of the modified form of load-equalizing device shown in FIG. 48;

FIGS. 50 and 51 are fragmentary sectional views taken along lines 50—50 and 51—51, respectively, of FIG. 49;

FIGS. 52 and 53 are fragmentary sectional views taken along lines 52—52 and 53—53, respectively, of FIG. 51;

FIG. 54 is a fragmentary sectional view similar to FIG. 51, showing the various operative elements in position for supporting the truck-body in raised position to permit load-equalizing adjustment of the truck-body with respect to the tandem;

FIG. 55 is a fragmentary perspective view of the lifting cam and locking pin mechanism forming a part of the modified form of load-equalizing device shown in FIG. 48;

FIG. 56 is a fragmentary perspective view of a further modified form of load-equalizing device constructed in accordance with and embodying the present invention;

FIGS. 57, 58, and 59, are fragmentary vertical sectional views all taken along line 57—57 of FIG. 56 and respectively showing the locking-bar in its several operative positions; and FIG. 60 is a fragmentary horizontal sectional view taken along line 60—60 of FIG. 57.

Referring now in more detail and by reference characters to the drawings, which illustrate practical embodiments of the present invention, A designates a trailer-body conventionally comprising a roof 1, side walls 2, 3, a front wall 4 and a bottom wall 5. The particular details of internal construction and bracing of a trailer-body A are not shown or described herein inasmuch as the trailer-body A may be of any conventional construction or design. It is sufficient for present purposes to indicate that the bottom wall or floor 5 of the trailer-body A is structurally supported by spaced parallel longitudinal channel-beams 6, 7, and channel-shaped side rails 8, 9, which are structurally interconnected and welded to a series of transversely extending uniformly spaced floor-sills 10.

As will be seen by reference to FIGS. 2, 4, and 6, the floor-sills 10 are of so-called "tapered" and tubular configuration, having a substantially rectangular cross-sectional shape and being provided with a flat, horizontal top flange 11 which extends flatwise across the underside of the floor 5. The floor-sills 10 are also provided with a bottom flange 12 which extends angularly downwardly and inwardly from the outer end to a flat, horizontal medial section 13. In other words, the floor-sills 10 are substantially deeper in the center than at their outer ends and the downwardly presented surfaces 13 of the floor-sills 10 serve as a flat base-surface upon which the trailer-body A may rest securely when placed on a shipping dock, flatcar, boat ferry, or freighter deck, for "pig-a-back" shipment. If straight floor-sills are used, the outboard ends must be notched so that such outboard ends are not as deep as the center portions thereof.

B designates a so-called tandem rear-axle assembly which is also of substantially conventional construction and comprises two longitudinally extending channel-shaped frame members 14, 15, respectively, provided with depending shackle-hangers 16, 17, 18, 19, 20, 21, which, in turn, support pairs of elliptical springs 22, 23, 24, 25. Suitably mounted upon, and extending transversely between, the springs 22, 24, and 23, 25, are axles 26, 27, which, in turn, operatively support sets of dual wheels and tires W.

Provided for adjustably and detachably connecting the trailer-body A to the rear-axle tandem B is a load-equalizing device $D^1$, the components of which are shown in exploded relationship in FIG. 3. The load-equalizing device $D^1$ comprises a slide-frame $F^1$, consisting of three transversely extending spaced parallel cross-members 28, 29, 30, of identical size and shape. As will be seen by reference to FIG. 4, the cross-members 28, 29, 30, are also substantially similar in shape to the floor-sills 10, being of substantially tubular internal shape and having flat, horizontal top flanges 31, 32, 33, respectively. The cross-members 28, 29, 30, also are provided with bottom flanges 34, 35, 36, which extend angularly downwardly and inwardly to flat, horizontal medial sections 37, 38, 39, respectively, along which the cross-members 28, 29, 30, are securely welded to the frame-members 14, 15, of the tandem rear-axle assembly B, all as best seen in FIGS. 3 and 4.

Notched into the top flanges 31, 32, 33, of the cross-members 28, 29, 30, and securely welded in place are longitudinally extending, upwardly opening slide-channels 40, 41, which are internally provided, at suitably spaced intervals, with rectangular slide-blocks 42 formed preferably of a hard, dense, phenolic resin or similar material capable of supporting substantial compressive stresses and, at the same time, affording a desirable anti-friction surface. It will be noted by reference to FIGS. 3 and 6 that the slide-blocks 42 are shorter in vertical dimension than the depth of the slide-channels 40, 41, and, consequently, the horizontal top faces of the slide-blocks 42 will be disposed downwardly below the plane of the top margins of the slide-channels 40, 41. It will also be noted by reference to FIG. 8 that the slide-blocks are held against longitudinal shifting movement by means of small, transverse cross-bars 43 which are welded to the bottom flanges of the slide-channels 40, 41. Furthermore, a slide-block 42 is located adjacent to each end of the slide-channels 40, 41, so as to form a transverse closure therefor and these endmost slide-blocks 42 are held in place by short, transverse plates 44 welded across the ends of the slide-channels 40, 41. The space or so-called "pockets" between the slide-blocks 42 within the slide-channels 40, 41, are filled with grease or some other suitable solid or highly viscous lubricant to provide so-called built-in "grease pockets" or "oil pockets," depending upon the type of lubricant used.

Welded or otherwise rigidly secured to, and extending lengthwise along, the under-faces of the beams 6, 7, are load-equalizing rails 45, 46, which are substantially identical in shape and construction and each comprise flat, horizontal top and bottom plates which are rigidly secured in spaced parallel relation by means of a series of uniformly spaced rectilinear blocks 49, welded in place with their inwardly presented faces flush with the inwardly presented faces of the plates 47, 48, and with their outwardly presented faces spaced inwardly from the outwardly presented edges of the plates 47, 48, so as to afford a continuous marginal lip 50, all as best seen in FIG. 9, and for purposes presently more fully appearing.

Welded or otherwise rigidly secured to the under-face of the plate 48 and extending longitudinally therealong is a slide-rail 51 which is of the same length as, but somewhat narrower in transverse width than, the plate 48, being disposed in symmetrical relationship to the plate 48 so that the longitudinal margins of the rail 51 are spaced equidistantly inwardly from the adjacent longitudinal margins of the plate 48. Moreover, the plate 48 is of substantially the same width as the slide-channels 40, 41, and the slide-rails 51 are somewhat narrower than the slide-channels 40, 41, so as to fit freely and slidably down into the slide-channels 40, 41, as best seen in FIGS. 6 and 8, upon the slide-blocks 42, and is in lubricative contact with the lubricant loaded into the "pockets" between the slide-blocks 42. In fact, the slide-channels 40, 41, are preferably filled with lubricant above the level of the top surfaces of the slide-blocks 42 so that the entire interior of the channels 40, 41, are, in effect, lubricant reservoirs. It will be noted by reference to FIG. 8, that the upper horizontal margins of the plates 44 are spaced downwardly from the top surfaces of the slide-block 42 so as to avoid any interference with the longitudinal sliding movement of the rails 51 upon the upwardly presented horizontal surfaces of the slide-block 42.

Rigidly secured transversely across the opposite ends of the plates 47, 48, are rectangular end-plates 52, 53, which serve both as end-stops and also as means for reinforcing, strengthening, and stabilizing the structure. It should be noted in this connection that the rectangular blocks 49 are preferably solid and of comparatively heavy cross-sectional shape, so as to afford extremely high compressive strength between the plates 47, 48, and thereby reinforcing the plates 47, 48, so that the load-equalizing rails 45, 46, will be strong, rugged, and capable of supporting the trailer-body A under extremely heavy load conditions.

The cross-members 28, 29, 30, are each provided, centrally of their lateral faces, with rectangular access-apertures 54, which are externally covered by rectangular closure-plates 55 held in place by means of bolts 56. Journaled in, and extending horizontally through, the closure-plates 55, centrally of the apertures 54, is a shaft 57 provided on its external ends with washers 58, 59, the latter being held in place by means of a cotter pin 60 inserted diametrally through the projecting end of the shaft 57. On its other or forward end, the shaft 57 is rigidly provided with a depending crank-arm 61 formed preferably of angle iron and having the upper end of its lateral flange bent arcuately around the shaft 57 for securement thereto by means of a bolt 62, as best seen in FIGS. 3 and 8.

Pinned or otherwise rigidly mounted upon the shaft 57 internally within the tubular cross-members 28, 30, are diametrally extending rocker-arms 63, which are provided in their outer ends with short, horizontal pins 64, 65, for operative engagement in elongated slots 66, 67, respectively, formed in the terminal portions 68, 69, of pull-rods 70, 71, the latter being threadedly secured at their outer ends in clevis-sleeves 72, 73. Operatively secured within the clevis-sleeves 72, 73, by means of upright pins 72', 73', are pull-bars 76, 77, which are, in turn, vertically bifurcated at their outer ends and provided with cross-pins 78, 79, respectively, for operative engagement within slots 80, 81, formed in the lower ends of upwardly extending rocker-links 82, 83, the latter being pivoted intermediate their ends upon horizontal pivot-pins 84, 85, rigidly mounted at their opposite ends in the cross-members 28, 30, substantially in the manner shown in FIG. 6.

The rocker-links 82, 83, project upwardly above the pivot-pins 84, 85, through slots 86, 87, formed in the top flanges 31, 33, of the cross-members 28, 30, respectively, and, at their upper ends, are operatively connected by means of pins 88, 89, within the bifurcated ends of horizontally shiftable locking-bars 90, 91.

The locking-bars 90, 91, extend horizontally inwardly from the rocker-links 82, 83, respectively, and project loosely through guide-slots 92, 93, formed in the upper ends of guide-blocks 94, 95, which are, in turn, welded upon the upper faces of the top flanges 31, 33, of the cross-members 28, 30, respectively. As will be seen by reference to FIG. 6, the guide-blocks 94, 95, are located outwardly of, and contiguous to, the slide-channels 40, 41, respectively. It will also be noted that the locking-bars 90, 91, are of such width and thickness as to fit slidably, but, nevertheless, snugly within the space between two adjacent blocks 49 of the load-equalizing rails 45, 46, so as to lock the load-equalizing rails 45, 46, in some selected position of longitudinal adjustment with respect to the slide-channels 40, 41. The locking-bars 90, 91, in combination with the guide-blocks 94, 95, also serve to retain the load-equalizing rails 45, 46, within the slide-channels 40, 41, and prevent unauthorized vertical detachment of the trailer-body A from the tandem rear-axle assembly B. Although, for purposes of illustration in FIG. 6, a substantial amount of clearance is shown between the locking-bars 90, 91, and the guide-slots 92, 93, this clearance, in actual practice, is relatively small and is not sufficient to permit the slide-rails 51 to jump out of the slide-channels 40, 41, as a result of the jolting encountered during actual use upon roads and highways. In fact, the load-equalizing rails 45, 46, the locking-bars 90, 91, and the guide-blocks 94, 95, are extremely strong in structural design and effectively establish secure connection between the trailer-body A and the tandem rear-axle B under the most severe operative conditions.

Pivotally secured to the lower end of the crank-arm 61, by means of a pin 96 and clevis-fitting 97 is a pull-rod 98 which extends slidably and shiftably through a vertical slot 99 formed in a vertical guide-plate 100, which is welded or otherwise rigidly secured on the forwardly presented lateral face of the cross-member 28. At its outwardly projecting end, the pull-rod 98 is integrally provided with a handle-loop 101 by which the pull-rod 98 may be manually operated. Intermediate its ends, the pull-rod 98 is provided with an upstanding detent-boss 102 and a bend-formed detent-shoulder 103, the latter being spaced outwardly from the detent-boss 102 by a predetermined distance, so that when the pull-rod 98 is manually pulled outwardly and lifted, the detent-shoulder 103 will engage against the guide-plate 100 in the position shown in FIG. 16. Similarly, when the pull-rod 98 is pulled outwardly for a greater distance and lifted, the detent-boss 102 will engage the guide-plate 100 in the position shown in FIG. 18.

When the pull-rod 98 is pulled outwardly, the crank arm 61 will be rocked in a counter-clockwise direction (reference being made to FIG. 4) and the shaft 57 will be rotated, thereby causing the rocker-arms 63 to rotate in a counter-clockwise direction (reference being made to FIG. 6). The counter-clockwise rotation of the rocker-arms 63 will, in turn, draw the pull-rods 70, 71, inwardly, causing the rocker-links 82, 83, to rock, thereby shifting the locking-bars 90, 91, outwardly and withdrawing them from engaged position between adjacent pairs of blocks 49. When the pull-rod 98 is in the position shown in FIG. 16, the locking-bars 90, 91, will assume the partially withdrawn position shown in FIG. 17. In this position, the ends of the locking-bars 90, 91, are completely disengaged from the blocks 49, but, nevertheless, are in overlying slidable disposition upon the lips 50 of the bottom plates 48. Thus, the trailer-body A may be shifted longitudinally with respect to the tandem rear-axle B and load-equalizing adjustment thus effected. However, the locking-bars 90, 91, still prevent vertical removal of the trailer-body A from the tandem rear-axle B.

When the pull-rod 98 is in the position shown in FIG. 18, the locking-bars 90, 91, are completely withdrawn from engagement with the load-equalizing rails 45, 46, as shown in FIG. 19, and the trailer-body A can then be vertically removed from the tandem rear-axle B for disposition upon a flatcar, boat-ferry, or freighter deck, for "pig-a-back" transportation.

The cross-members 28, 30, are internally provided with tension springs 104, 105, which are respectively hooked at their outer ends to the bottom flanges 37, 39, of the cross-members 28, 30, by means of welded tabs 106, 107, respectively. At their opposite ends, the springs 104, 105, are respectively hooked into ears 108, 109, formed on the terminal portions 68, 69, respectively, of the pull-rods 70, 71. Thus, the pull-rods 70, 71, are biased forcibly by means of the springs 104, 105, into the locked position shown in FIG. 6.

Provided for rigid securement upon the under-face of the beam 9 of the trailer-body A is a pre-selector rail 110 having T-shaped cross-section and integrally including a vertical web 111 and horizontal cross-flange 112, which is provided along its outwardly presented margin with a plurality of uniformly spaced semi-circular detent-notches or recesses 113. Slidably mounted upon the preselector rail 110 for manual adjustment to any one of a number of selected longitudinal positions therealong is a pre-selector cam 114 integrally including a slotted head 115 adapted for sliding engagement along the cross-flange 112 and having an outwardly presented bifurcating slot 116 for loosely accommodating the upper end of a latch-pin 117 which is pivotally mounted intermediate its ends upon a horizontal pintle 118 which extends between laterally projecting ears 119, 120, formed integrally upon the outwardly presented face of a camming plate 121, which is, in turn, integrally mounted at its upper end upon, and projecting vertically downwardly from, the underside of the slotted head 115.

The latch-pin 117 extends downwardly below the pintle 118 and is biased outwardly by means of a hairpin spring 122 which is riveted or otherwise suitably mounted upon the camming plate 121. Normally, the latch-pin 117 assumes the position shown in full lines in FIG. 15, so that its upper end is engaged in one of the detent-notches 113, thereby holding the pre-selector cam 114 in a selected longitudinal position along the pre-selector rail 110. When it is desired to move the pre-selector cam to another position, the lower portion of the latch-pin 117 is pushed inwardly to the position shown in dotted lines in FIG. 15, thereby releasing the pre-selector cam 114 so that it can be manually shifted to another desired position.

As will be noted by reference to FIG. 16, the camming plate 121 projects downwardly below the pre-selector rail 110 by a distance sufficient to strike against the outwardly extending end of the pull-rod 98 when the detent-shoulder 103 thereof is engaged against the guide-plate 100 so that either the forwardly presented or rearwardly presented inclined margins of the camming plate 121 will ride against the pull-rod 98 and cam it downwardly out of retained position, thereby allowing the springs to pull the locking-bars 90, 91, back from the position shown in FIG. 17 to the position shown in FIG. 6. The pre-selector rail 110 is mounted on the trailer-body A, so that all of its associated parts will be just inside the outermost vertical plane of the side wall 3 and will be protected against accidental damage by the rub-rail 123 in case the trailer-body A should accidentally scrape against the side of a building, shipping dock, other vehicle, or similar obstruction. Of course, the outer extremities of the pull-rod 98 will project laterally beyond the trailer-body A when in outwardly retained position as shown in FIG. 16, but the pull-rod 98 is only in this position when it is necessary to effect load-equalizing adjustment between the trailer-body A and the tandem rear-axle B. This load-equalizing adjustment is only carried out under proper conditions when the trailer-body A is relatively "in the clear," so to speak. Consequently, the externally exposed position of the pull-rod 98, under these circumstances, presents no hazard.

As will be seen by reference to FIG. 18, the pull-rod 98 may also be pulled out beyond the position shown in FIG. 16, so that it will be retained in an extreme outermost position by means of engagement between the detent-boss 102 and the guide-plate 100. In this position, the portion of the pull-rod 98 which extends between the detent-boss 102 and the detent-shoulder 103 will be located downwardly below the lowermost line of travel of the camming plate 121, by reason of the offset introduced by the bend used to form the detent-shoulder 103. As above noted, in this outermost position, the locking-bars 90, 91, will be completely withdrawn, so that the trailer-body A can be lifted entirely away from the tandem rear-axle B, but the camming plate 121 will not be able to knock the pull-rod 98 downwardly off of its outermost retained position, as shown in FIG. 18.

It will also be noted, in this connection, that the locking-bars 90, 91, are beveled across their inwardly presented transverse top margins, as at C¹, and also along one inwardly presented lateral corner, as at C², all as best seen in FIGS. 5 and 20, thereby facilitating the entry of the locking-bars 90, 91, into the spaces between the blocks 49.

In use, the pull-rod 98 is dropped down into its innermost position, as shown in FIG. 5, and the related elements operatively connected to the shaft 57 will be drawn inwardly by means of the springs 104, 105, to the locked position shown in FIG. 6. In this position, the trailer-body A is securely connected to the tandem rear-axle B for normal over-the-road use. When it is necessary to shift the longitudinal relationship between the trailer-body A and the tandem rear-axle B, so as to effect load-equalization, the trailer-body A, supported at its front end upon the conventional motive tractor, is parked in some suitable or accessible location and the pull-rod 98 may be shifted outwardly to the position shown in FIG. 16, thereby withdrawing the locking-bars 90, 91, to the position best shown in FIG. 17, so that the trailer-body A is free to slide longitudinally with respect to the tandem rear-axle B. The latch-pin 117 is then pushed in and the pre-selector cam 114 shifted longitudinally along the pre-selector rail 110 to some desired position corresponding to the adjusted load-equalizing position required for the particular load conditions of the trailer-body A. The truck driver then will set the brakes on the tandem rear-axle B and slowly drive the tractor forwardly or rearwardly as may be necessary so as to shift the trailer body A longitudinally with respect to the tandem rear-axle B. During the course of this longitudinal shifting movement, the camming plate 121 will ride over the outwardly projecting portion of the pull-rod 98 and knock it down off of outwardly retained position, thereby permitting the springs 104, 105, to snap the locking-pins 90, 91, back into engaged position. The contact between the camming plate 121 and the pull-rod 98, as well as the return of the locking-bars 90, 91, to engaged position, will produce a clearly audible sound which will carry forward to the truck driver who can immediately stop the forward or rearward movement of the tractor and the load-equalizing adjustment will be automatically completed.

Whenever it is necessary to remove the trailer-body A entirely from the tandem rear-axle B, the pull-rod 98 can be pulled all the way out of its outermost position as shown in FIG. 18, in which position, as above stated, the locking-bars 90, 91, will be completely disengaged from the load-equalizing rails 45, 46, and the trailer-body A can be lifted upwardly, as indicated in FIG. 20.

It is also possible to provide a modified form of load-equalizing device D², as shown in FIGS. 21 to 38, inclusive. The load-equalizing device D² comprises two load-equalizing rails 124, 125, which are substantially identical to the previously described load-equalizing rails 45, 46. The load-equalizing device D² also includes cross-members 126, 127, 128, which are substantially identical to the previously described cross-members 28, 29, 30, each being provided with rectangular openings 129 covered by closure-plates 130, through which a shaft 131 is journaled, the latter being operatively held in place at its forwardly and rearwardly projecting ends by means of washers 132, 133, and cotter pins 134, 135.

Notched into and extending lengthwise along the outer ends of the cross-members 126, 127, 128, are slide-channels 136, 137, which are substantially similar to the previously described slide-channels 40, 41, and are provided with slide-blocks 138 similar to, and for the same purpose as, the previously described slide-blocks 42. Adjacent their forward and rearward ends, however, the slide-channels 136, 137, are provided in their bottom walls with downwardly presented rectangular openings 139 which are vertically aligned with matching openings 140 formed in the top flanges 141, 142, 143, respectively of the cross-members 126, 127, 128. Set into the openings 140 and extending down into the interior of the tubular cross-members 126, 127, 128, are vertical pocket-members 144 preferably of substantially rectangular cross-sectional shape and integrally including side walls 145, 145', transverse walls 146, 146', and a horizontal bottom wall 147. The side walls 145, 145', of each of the pocket-members 144 are provided with transversely aligned vertical slots 148, 149, which extend upwardly across the medial portions thereof. Disposed within the bottom portion of each of the pocket-members 144 and resting securely upon the bottom walls 147 thereof is a rectilinear bearing-support 150 which is provided with a horizontal pintle 151, the longitudinal axis of which extends generally in the direction of slidable travel of the load-equalizing rails 124, 125, and rotatably supports a roller 152, the upper surface of which is located above the upper margin of the bearing-support 150 and the lower margin of the slots 148, 149, thereby providing a rolling, anti-friction support for engagement against the bottom surface of a wedge-shaped pull-bar 153 which extends through the slots 148, 149, and is bifurcated at its outer end in bracing engagement around the lower end of a rocker-link 154, which has an elongated slot 155 operatively engaged around a horizontal pin 156 extending across the bifurcated end of the pull-bar 153. The rocker-link 154 is substantially similar to the previously described rocker-links 82, 83, and is pivoted approximately midway between its ends upon a horizontal pivot pin 157 fixed at its ends in and extending across the tubular cross-members 126, 127, 128.

At their upper ends, each of the rocker-links 154 are operatively engaged in the bifurcated ends of locking-bars 158 which extend loosely through guide slots 159 of guide-blocks 160, the latter being substantially identical with the previously described guide-slots 92, 93, and guide-blocks 94, 95. As described in connection with the previous embodiment, the locking-bars 158 are adapted to engage any one of the open spaces of the load-equalizing rails 124, 125, when in fully engaged position, as shown in FIG. 24. The locking-bars 158 may also be partially withdrawn to the position shown in FIG. 36 in order to permit longitudinal movement between the load-equalizing rails 124, 125, and the slide-channels 136, 137, for purposes of load-equalizing adjustment, while preventing vertical removal of the load-equalizing rails 124, 125, from the slide-channels 136, 137.

At their inner ends, the pull-bars 153 are operatively secured by means of pins 161 to clevis-sleeves 162, which are substantially identical with the previously described clevis-sleeves 72, 73, and are threadedly engaged at their inner ends upon pull-rods 163, the latter being, in turn, provided at their inner ends with flattened terminal portions 164 having elongated slots 165, 166, for connection by means of pins 167, 168, to rocker-arms 169, which are substantially identical with the previously described rocker-arms 63 and are hinged or otherwise suitably mounted upon the shaft 131.

The terminal portions 164 are provided with depending apertured ears 170, 171, for hooked engagement with the inner ends of tension springs 172, 173, which are, in turn, hooked at their opposite ends through apertured tab plates 174, 175, welded to the bottom walls 147 of the pocket-members 144. The springs 172, 173, serve to bias the rocker-arms 169 and all related elements to the fully locked position of FIG. 24. Pinned or otherwise rigidly secured to the shaft 131, preferably adjacent to each of the cross-members 126, 127, 128, are three identical crank-arms 176 which are substantially similar in construction to the previously described crank-arm 61. Each of the crank-arms 176 is operatively connected at its lower end by means of a clevis-fitting 177 piston rod 178 which extends through a packing gland 179 into an air cylinder 180 and is operatively secured at its internal end to a piston 181. It will, of course, be understood that there are three identical air cylinders 180 respectively associated with the three crank-arms 176.

As will be seen by reference to FIG. 35, each of the cylinders 180 is internally subdivided by means of a partition 182 into a long chamber 183 in which the piston 181 operatively works and a short chamber 184, the latter being operatively provided with a piston 185 which is rigidly secured upon the inner end of a piston rod 186 extending slidably through a packing gland 187 which is mounted on the other end of the cylinder 180 with respect to the packing gland 179 and in axial alignment therewith. The chambers 183, 184, are vented to atmosphere through downwardly presented openings 188, 188', and the pistons 181, 185, are biased outwardly away from the partition 182 by means of compression springs 189, 190. The piston rod 186 extends outwardly and is rockably, but non-shiftably, connected by means of a clevis-fitting 191 and pin 192 to a bracket 193 which is welded to the side face of the cross-member 127, as best seen in FIG. 26. It should be noted in this connection that the cylinder 180 is supported solely through the piston rod 186 upon the bracket 193 and is otherwise free to "float" with respect to the pistons 181, 185. The chambers 183, 184, are, moreover, operatively connected by means of sections of flexible tubing 194, 194', to a pneumatic power system presently to be described in detail.

Slidably mounted within the upper ends of each of the pocket-members for vertically shiftable movement with respect thereto are tubular rectilinear roller-carriers 195 provided at their lower ends with longitudinally extending pintles 196 which are parallel to, and spaced upwardly from, the pintles 151 and rotatably support rollers 197 which bear operatively upon the upward inclined faces of the pull-rod 153. At their upper ends, the roller-carriers are provided with transversely extending pintles 198 disposed in upwardly spaced right angular relation to the pintles 196 for rotatably supporting rollers 199, which project upwardly through the openings 139, 140. When the shaft 131 is rotated in a counter-clockwise direction, reference being made to FIG. 23, the pull-bars 153 are drawn inwardly from the position shown in FIG. 24 to the position shown in FIG. 36 and the rollers 197 will ride upwardly on the inclined surfaces of the pull-bars 153, thereby elevating the roller-carriers 195, bringing the rollers 199 up into supportive engagement against the under-faces of the load-equalizing rails 124, 125, so that the latter are lifted upwardly off of the slide-blocks 138 and are supported for relatively free anti-friction movement longitudinally over the rollers 199.

As will be seen by reference to FIG. 36, the locking-bars 158 have sufficient clearance within the guide-slots 159 of the guide-blocks 160 so as to cock upwardly through a distance equal to the upward movement of the rollers 197 and the corresponding upward movement of the load-equalizing rails 124, 125, but, nevertheless still bear against the outer lip portions of the load-equalizing rails 124, 125, to prevent complete separation between the load-equalizing rails 124, 125, and the slide-channels 136, 137.

The pull-bars 153 may also be pulled further inwardly so as to withdraw the locking-bars 158 entirely from engagement with the load-equalizing rails 124, 125, in order to permit complete detachment substantially for the same purposes as described in connection with the previous embodiment.

The central cross-member 127 is also provided with a rocker arm 169 pinned or otherwise rigidly attached to the shaft 131 and is connected by pins 167, 168, to slots 165, 166, in the terminal portions 164 of pull-rods 163, the latter being operatively connected by means of clevis-sleeves 162 and pins 161 to wedge-shaped pull-bars 153 which operate between rollers 152, 197, for elevating rollers 199 into engagement with the under-faces of the load-equalizing rails 124, 125. These particular pull-bars, however, are not connected at their outer ends to rocker-links 154. In other words, the central cross-member 127 does not have any locking bars 158 for engagement within the detent-pockets of the load-equalizing rails 124, 125, as best seen in FIG. 25.

The pneumatic power system employed for operation of the cylinder 180 as shown schematically in FIG. 38 includes a source of compressed air C which may be of any conventional type and is, therefore, not shown or described herein in detail. The use of compressed air pumps and compressed air storage tanks in connection with tractor-trailer equipment is, in fact, quite common in this art and, therefore, it is sufficient merely to point out that the conventional source of compressed air C is connected by a two-branched supply line 200 to a pneumatic valve housing 201 through entry fittings 202, 203 which open respectively to separate chambers 204, 205, having 90° arcuate by-pass undercuts 206, 207, respectively. Operatively mounted within the chambers 204, 205 are cylindrical valve-plugs 208, 209, which are respectively sealed for rotative movement within the chambers 204, 205, by pairs of O-rings 210—210' and 211—211', respectively. The cylindrical valve-plugs 208, 209, are rigidly connected to coaxial shafts 212, 213, which extend operatively through the side walls of the valve housing 201 and are externally provided with operating handles 214, 215, respectively. The valve-plugs 206, 207, are also respectively provided with diametral ducts 216, 217, as best seen in FIGS. 33 and 34. The valve chambers 204, 205, also open to outlet fittings 218, 219, which are positioned oppositely to the by-pass undercuts 206, 207, and to exhaust fittings 220, 221, which are positioned oppositely to the entry fittings 202, 203, respectively. The duct 216 serves to establish optional connection between the entry fitting 202 and the exhaust fitting 220 which opens to outside atmosphere or between the entry fitting 202 through the by-pass undercut 206 to the outlet fitting 218. Similarly, the duct 217 serves to establish optional connection between the entry fitting 203 and the exhaust port 221, which opens to outside atmosphere, or between the entry fitting 203 through the by-pass undercut 207 to the outlet fitting 219. The handle 215 is biased upwardly against stop 222, by means of a tension spring 223 hooked at its opposite ends in an aperture 224 on handle 214 and pin 225 on the lateral face of the valve housing 201. As will be seen by reference to FIGS. 33 and 34, when the handles 214, 215 are in the "up" position, the ducts 216, 217, will establish connection respectively between the outlet fittings 218, 219, to atmosphere through the exhaust ports 220, 221, and the springs 189, 190, of the cylinder 180 will force the pistons 181, 185, to the positions shown in FIG. 35 and the crank-arm 176 will be shifted over to the position shown in FIG. 23. In such position, the locking-bars 158 will be engaged in the load-equalizing rails 124, 125, to prevent relative shifting movement thereof.

The valve housing 201 is rigidly supported by means of horizontal brackets 226, 227, and is rigidly provided upon its front wall with a horizontal slide-block 228, which is internally provided with a horizontal slide-channel 229, which is, in turn, provided in its top and bottom walls with vertically aligned elongated slots 230, 231. Shiftably mounted within the slide-channel 229 and projecting outwardly from the end thereof, beyond the side wall of the valve housing 201, is a beveled latch-tongue 232 which is internally provided with a vertical slot 233 having a transverse pin 234 which supports a small roller 235. Rigidly mounted in vertically aligned relation above the slots 230, 231, is a pair of horizontal pins 236, 237, which are slidably engaged in a slot 238 of an actuator-bar 239, which is beveled at its lower end and enters the slot 230 so as to bear against the roller 235. The latch-tongue 232 is biased outwardly by means of a compression spring 240 into position for latching engagement with the handle 215 and, in turn, by means of the roller 235 holds the actuator-bar in upwardly shifted position, as shown in FIG. 30. At its upper end, the actuator-bar 239 is integrally provided with a flat, outwardly projecting horizontal arm 241 which is located substantially above the outer end of the handle 215, as the latter is in normally upwardly biased position and is located so as to lie in the path of a camming plate 242, which is substantially identical with the previously described camming plate 121 and is part of a pre-selector cam 243, which is identical with the previously described pre-selector cam 114. The pre-selector cam 243 is slidably mounted on a pre-selector rail 244, which is, in turn, identical with the previously described pre-selector rail 110 and serves the same function or purpose.

The modified form of load-equalizing device $D^2$ is mounted on a tandem rear-axle and trailer-body in substantially the same manner as above described in connection with the load-equalizing device $D^1$. Thus, when it is desired to effect a load-equalizing adjustment with the load-equalizing device $D^2$, the tractor-trailer unit is parked in any suitable or accessible location and the brakes of the tandem rear-axle set so as to hold the tandem rear-axle stationary. Thereupon, the handle 215 is manually pushed downwardly from the position shown in dotted lines in FIG. 31 to the position shown in full lines. In this position, the handle 215 will push past the latch-tongue 232 and be held in the "down" position thereby, substantially as shown in FIG. 30. In this "down" position, the valve-plug 209 will assume the position shown in FIG. 34 and establish connection through the diametrical duct 217, the lateral duct 219, and the tubing 194, to the chamber 183 of the cylinder 180 and forcibly shifting the piston 181 back toward the partition 182, compressing the spring 189. Since the handle 214 is in the "up" position (shown in full lines in FIG. 33), the valve-plug 208 will be in a position to establish connection between the exhaust port 220 and the tubing 194' and the piston 185 will remain stationary within the chamber 184, thereby holding the cylinder stationary so that the movement of the piston 181 will be translated to the piston-rod 178 into movement which will rock the crank-arm 176 in a counter-clockwise direction (reference being made to FIG. 23). This movement imparted to the shaft 131 will swing the upper ends of the rocker-links outwardly, shifting the locking-bars 158 from the position shown in FIG. 24 to the position shown in FIG. 36, and this latter position will be maintained as long as air is maintained within the chamber 183.

With the locking-bars shown in FIG. 36, the load-equalizing rails 124, 125, can be shifted in relation to the slide-channels 136, 137. Meanwhile, the pre-selector cam 243 is shifted to a desired position corresponding to the position of adjustment desired for the load-equalizing rails 124, 125. Thereupon, the truck driver can ease the tractor forwardly or rearwardly as may be required until the camming plate 242 rides over the horizontal arm 241 of the actuator-bar 239. As this occurs, the actuator-bar 239 will be shifted downwardly to the position shown in dotted lines in FIG. 30, and, acting against the roller 235, will shift the latch-tongue 232 within the slide-channel 229, withdrawing it from retentive engagement with the handle 215 and allowing the handle to return to "up" position under action of the spring 225. As the handle 215 returns to "up" position, the valve-plug 209 will return to the initial position shown in FIG. 38, thereby establishing connection between the tubing 194 and the exhaust port 221, whereupon the spring 189 will return the piston 181 to the initial position shown in FIG. 35 and the locking-bars 158 will return to the locked position shown in FIG. 24. If, due to momentary misalignment, a particular pair of detent pockets in the load-equalizing rails 124, 125, are not exactly in transverse alignment with the locking-bars 158 as the latter tend to return to locked position, the pins 167, 168, will move in the slots 165, 166, to prevent the locking-bars 158 from jamming and the latter will snap into fully engaged position automatically as soon as the load-equalizing rails 124, 125, have been shifted slightly further to bring a pair of detent pockets into transverse alignment with the locking-bars 158. As soon as the truck driver hears the clicking sound which indicates that the locking-bars 158 have moved into locked position, the movement of the tractor may be stopped and the load-equalizing adjustment will have been completed.

If it is desired to remove the trailer-body entirely from the tandem rear-axle for purposes of "pig-a-back" transportation, the handle 215 may be manually shifted into the downward position to effect initial disengagement of the locking-bars 158 in the manner above described and then the handle 214 can be pushed into "down" position, thereby admitting compressed air to the chamber 184. Since the piston 185 and the piston-rod 186 are held in non-shiftable position in relation to the cross-member 128 by means of the bracket 193, the effect of admission of air into the chamber 184 is to shift the entire cylinder 180 to the right (reference being made to FIG. 35). Since the chamber 183 is now charged with air under pressure and the piston 181 is relatively stationary within the cylinder 180, the bodily movement of the entire cylinder 180 will impart additional movement to the piston-rod 178 and rock the crank-arm 176 further in the counter-clockwise direction, thereby withdrawing the locking-bars 158 entirely from engagement with the load-equalizing rails 124, 125, and permitting complete removal of the trailer-body from the tandem rear-axle on which it is mounted.

It will, of course, be evident that the entire load or weight of the trailer-body to the under-side of which the load-equalizing rails 124, 125, have been welded or otherwise rigidly secured, will be elevated and supported upon the rollers 199 and the elevating forces will be applied to the rollers 199 through the wedge-shaped pull-bars 153 acting between the rollers 152, 197. As a result, both the elevating movement and the longitudinal sliding movement will be very smooth and free-acting. On the other hand, during over-the-road operations, the load or weight of the trailer-body is supported upon the slide-blocks 138 of the slide-channels 136, 137, which are lubricated by grease or other heavy lubricant deposited in the grease-pockets between the slide-blocks 138, thereby achieving very efficient and rugged securement between the trailer-body and the tandem rear-axle under all road conditions.

It is also possible to provide another modified form of load-equalizing device $D^3$, as shown in FIGS. 39 to 47, inclusive. This modified form of load-equalizing device $D^3$ is substantially similar in all respects to the previously described load-equalizing device $D^2$, except that it is designed for entirely manual operation and eliminates the pneumatic power driving system of the load-equalizing device $D^2$.

The load-equalizing device $D^3$ includes locking-bars 158′, rocker-links 154′, pull-bars 153′, and pull-rods 163′, which are respectively identical in construction and operation to the locking-bars 158, rocker-links 154, pull-bars 153, and pull-rods 163, of the previously described load-equalizing device $D^2$. At their inner ends, the pull-rods 163′ are provided with clevis-shaped terminal portions 245 having longitudinal slots 246 which are connected by means of pins 247 to triangular rock plates 248, which are, in turn, pivotally secured by means of pins 249 to brackets 250, which are, in turn, welded or otherwise rigidly mounted on a cross-member 251. It will be understood that the cross-member 251 is substantially identical in form and construction with the previously described cross-member 126, except that it is provided, in the medial portions of its lateral face, with an uncovered slot or opening 252.

The cross-member 251 will, of course, have two rock plates 248, which are, in turn, connected by means of pins 253 to converging links 254, 255, which extend through the slot 252 and are connected in common by means of a pin 256 to a longitudinal pull-link 257, all as best seen in FIG. 40.

Similarly, the load-equalizing device $D^3$ includes a cross-member 258 which is substantially similar to the previously described cross-member 128 except that it is provided in the medial portion of its lateral face, with an uncovered slot or opening 259. Internally, the cross-member 258 is provided with pull-rods 163″, which are also substantially similar in construction and operation to the previously described pull-rods 163 and are provided with clevis-shaped slotted terminal portions 260 connected by pins 261 to triangular rock-plates 262, which are, in turn, pivotally connected by means of pins 263 to brackets 264 welded or otherwise rigidly mounted upon the cross-member 258. The rock-plates 262 are also connected by means of pins 265 to converging links 266, 266′, which are, in turn, connected in common by means of a pin 267 to a pull-link 268, all as best seen in FIG. 42.

The load-equalizing device $D^3$ also includes an intermediate cross-member 269 which is substantially similar to the previously described cross-member 127 except that it is provided in the medial portion of its lateral faces with elongated slot or opening 270. Welded upon one of the lateral faces of the cross-member 269 is a bracket plate 271 having a slot 272 aligned with the slot 270. Welded or otherwise rigidly mounted to the bracket plate 271 in laterally disposed relation to the slot 272 is an angular bracket 273 and rockably mounted thereon by means of a pin 274 is an operating lever 275 which extends transversely outwardly between the cross-members 251, 269, and through an elongated slot 276 formed in a pre-selector plate 277 which is welded or otherwise rigidly mounted adjacent to, but slightly inwardly from, the outer vertical plane of the side wall of a trailer-body A′, as shown in FIG. 39. At its outwardly projecting end, the operating lever 275 is provided with a handle 278 and, just inwardly with respect to the handle 278, the operating lever 275 is provided with a circular aperture 279 for optional registration with a circular eye 280 so that a padlock or other similar locking device (not shown) may be inserted to hold the operating lever 275 in the position shown in FIG. 44.

The slot 276 of the pre-selector plate 277 is provided, adjacent its rear end, with two longitudinally spaced upwardly directed detent notches 281, 281′. Pivotally mounted on the pre-selector plate 277 above the slot 276, by means of a pin 282 is a release-dog 283 which normally extends across the detent notch 281 and is integrally provided with an upwardly projecting camming plate 284 which extends upwardly into the path of a camming plate 285 which is an integral part of a pre-selector cam 286, the latter being substantially identical with the previously described pre-selector cams 243 and 114. The pre-selector cam 286 is slidably mounted on a pre-selector rail 287 which is substantially identical with the previously described pre-selector rails 244 and 110, and functions in substantially the same manner. As will be seen by reference to FIG. 44, the release-dog 283 is held in horizontal position by means of a pin 288 which normally rests on the top edge of the pre-selector plate 277.

When it is desired to withdraw the locking-bars 158′ to permit longitudinally sliding relative movement of the load-equalizing device $D^3$, the handle 278 is manually grasped and the operating lever 275 shifted rearwardly and eased upwardly to the detent notch 281, lifting the camming plate 284 of the release-dog 283 into the path of the camming plate 285. The rocking movement thus imparted to the operating lever 275 will shift the pull-link 257 rearwardly and the pull-link 268 forwardly. These movements are transmitted respectively through the links 254, 255, and 266, 266′, to the rock-plates 248 and 262, respectively, and swing the pull-rods 163′, 163″, inward against the bias of the springs 289, which are substantially similar in construction and function to the previously described springs 104, 105, 172, 173.

The pre-selector cam 286 may be shifted to any desired position on the pre-selector rail 287 in the manner and for the purpose previously described and when the trailer-body A′ is shifted with respect to the tandem rear-axle B′, the camming plate 285 will, in due course, ride over the camming plate 284 and kick the operating lever 275 out of retained engagement within the detent notch 281, thereby allowing the locking-bars 158′ to return to locked position.

Whenever it is desired to remove the railer-body A′ entirely from the tandem rear-axle B′, the operating lever 275 can be swung all the way to the rear and engaged in the detent notch 281′. In this position, the locking-bars 158′ will be entirely withdrawn and the trailer-body A′ can be completely lifted up and away from the tandem rear-axle B′.

It is also possible to provide a further modified form of load-equalizing device $D^4$ which is substantially similar to the previously described load-equalizing device $D^3$ except that it is equipped with a pneumatic power-actuating system substantially identical with the power-actuating system used in connection with the load-equalizing device $D^2$.

The modified form of load-equalizing device $D^4$ includes elongated load-equalizing rails 290, 291, which are respectively identical with the previously described load-equalizing rails 124, 125, and are slidably mounted within slide-channels 292, 293, which are identical in all respects to the previously described slide-channels 136, 137, and are provided with a plurality of upwardly disposed rectangular slide-blocks 294 which are identical with the perviously described slide-blocks 138. The slide-channels 292, 293, are transversely connected by cross-members 295, 296, 297, which are substantially identical with the previously described cross-members 251, 258, and 269, respectively. The cross-member 295 is internally provided with pull-rods 298, 299, which are respectively connected by means of pins 300, 301, to triangular rock-plates 302, 303, which are, in turn, pivotally connected by means of pins 304, 305, to brackets 306, 307, welded or otherwise rigidly secured upon the rearwardly presented lateral face of the cross-member 295. The rock-plates 302, 303, are also pivotally connected by means of pins 308, 309, to converging links 310, 311, and the latter are, in turn, connected in common by means of a pin 312 to a pull-link 313.

Similarly, the cross-member 297 is internally provided with pull-rods 314, 315, which are pivotally connected by means of pins 316, 317, to triangular rock-plates 318, 319, which are, in turn, pivotally connected by means of pins 320, 321, to brackets 322, 323, welded or otherwise rigidly secured upon the forwardly presented lateral face of the cross-member 297. The rock-plates 318, 319, are also pivotally connected by means of pins 324, 325, to converging links 326, 327, which are connected in common by means of a pin 328 to a pull-link 329 which extends forwardly through a slide-bushing 330 carried by the intermediate cross-member 296.

The intermediate cross-member 296 is also internally provided with pull-rods 331, 332, which are pivotally connected by means of pins 333, 334, to triangular rock-plates 335, 336, which are, in turn, pivotally connected by means of pins 337, 338, to brackets 339, 340, welded or otherwise rigidly secured upon the forwardly presented lateral face of the cross-member 296. The rock-plates 335, 336, are also pivotally connected by means of pins 341, 342, to converging links 343, 344, which are pivotally connected in common to each other and to the pull-link 329 by means of a pin 345, which extends through a pivot fitting 346 which is rigidly mounted on the external end of a piston-rod 178', the latter being operatively mounted within a pneumatic cylinder 180', which is operatively provided at its opposite or forward end with a piston-rod 186'. The cylinder 180' and the pull-rods 178', 186', operatively associated therewith are identical with the previously described cylinder 180 and pull-rods 178, 186, as shown in FIG. 35 and are, therefore, not described again here in detail. It is sufficient for present purposes to note that the cylinder 180' is not only constructed, but operates, in exactly the manner previously described in connection with the cylinder 180. The piston-rod 186' is rigidly mounted at its forward end in the bracket 306.

Also welded or otherwise rigidly supported upon and extending forwardly from the intermediate cross-member 296 is a bracket 347 having an upstanding pivot pin 348 and an offset arm 349 which is provided with a guide-sleeve 350 through which the rear portion of the pull-link 313 is slidably mounted and supported. At its rearwardly projecting end, the pull-link 313 is provided with a pivot pin 351 which is operatively disposed in a slot 352 formed in one end of a swing-link 353 which is, in turn, rockably mounted upon the pin 348 and is provided at its other end with a slot 354 for operative engagement with the pivot pin 345.

The pneumatic cylinder 180' is connected to a pneumatic system and control valves identical with the previously described pneumatic system as shown in FIGS. 20 to 35, inclusive, and FIG. 38.

The cross-members 295, 296, 297, are all provided at their outer extremities with load-elevating and locking-pin assemblies of the type shown in FIGS. 51 to 54, inclusive. Inasmuch as these load-elevating and locking assemblies are identical in all respects, only one such assembly need be described in detail herein.

The load-elevating and locking assemblies comprise vertical pocket members 355 formed of short square-section tubing and welded or otherwise rigidly mounted vertically in the outer ends of the cross-members 295, 296, 297. At their upper ends, the pocket members 355 open into the slide-channels 292, 293, through suitably formed apertures and are internally provided with vertically shiftable roller-carriers 356 having a downwardly presented longitudinal roller 357 and an upwardly presented top roller 358, the latter being adapted to shift upwardly and elevate the roller substantially as the previously described elevating roller 199. The downwardly presented roller 357 rides upon an eccentric cam 359 which is rockably mounted upon a pin 360 suitably supported in downwardly spaced parallel relation to the roller 357. Formed integrally with and projecting downwardly from the cam 359 is a rocker-arm 361 which is pivotally connected by means of a pin 362 to a horizontal link 363 which is, in turn, pivotally connected by means of a pin 364 to one of the pull-rods, such as, for example, the pull-rod 299. The link 363 is integrally provided with a vertical arm 365 having two vertically aligned elongated slots 366, 367, which operatively engage horizontal pins 368, 369, rigidly mounted in and extending transversely between and through the bifurcated legs 370, 371, of a vertical bar 372, which is integrally joined at its upper end to a horizontally extending locking-bar 373. The locking-bar 373 is substantially similar in shape and construction to the above-described locking-bar 90, 91, 158, and is adapted to engage lockingly within the detent brackets of the load-equalizing rails 290, 291, in the same manner and for the same purposes as previously described.

The pins 368, 369, project beyond the legs 370, 371, and are slidably disposed within horizontally aligned pairs of angular slots 374, 375, 376, 377. When the pneumatic cylinder 180' is not under pressure and the piston-rods 178', 186', are in fully extended position, as shown in FIG. 50, the locking-bars 373, the eccentric cams 359, and the load-elevating rollers 358, will be in the position shown in FIG. 51. When, however, air is admitted to the cylinder 180', so as to retract the piston-rod 178', the links 363 will be pulled part way to the left (reference being made to FIGS. 51 and 54), rotating the cams 359 in a clockwise direction, thereby lifting the load-elevating rollers 358 into supporting engagement against the undersides of the load-equalizing rails 290, 291. At the same time, the movement of the links 363 will be transmitted through the pins 368, 369, to the vertical bar 372 and the locking-bars 373. As the pins 368, 369, move to the left with the link 363, they will also ride upwardly in the slots 374, 375, and 376, 377. The pitch or inclination of these slots is exactly equal to the rate of rise of the cam 359, therefore, as the load-equalizing rails 290, 291, are elevated by means of elevating rollers 358, the locking-bars 373 will be withdrawn horizontally and, at the same time, elevated with the rise of the load-equalizing rails 290, 291, and thereby withdrawing the locking-bars 373 to an intermediate disengaged position for allowing longitudinal shifting movement of the load-equalizing rails 290, 291, in relation to the slide-channels 292, 293, so that load-equalizing adjustment can be effected between the trailer-body $A^3$ and the tandem rear-axle $B^3$, substantially in the manner previously described in connection with the other embodiments of the present invention.

When compressed air is admitted to the other side of the cylinder 180', so as to shift the cylinder 180' and all of its related mechanism bodily along the stationary piston-rod 186', the links 363 and all of the related portions will be shifted to the position shown in FIG. 54, so that the locking-bars 373 will be entirely withdrawn from engagement with the load-equalizing rails 290, 291, and thereby permitting complete removal of the trailer-body $A^3$ from the tandem rear-axle $B^3$.

It is also possible to provide a further modified form of load-equalizing device $D^5$ which is somewhat similar to the previously described load-equalizing device $D^1$ and comprises a slide-frame $F^5$ similar to the previously described slide-frame $F^1$ consisting of a plurality of transversely extending cross-members 378 which are substantially similar to the previously described cross-members 28, 29, 30, and are centrally provided with a suitably bearinged shaft 379 similar to the previously described shaft 57. The shaft 379 is provided with a depending crank arm 380 which is substantially similar to the previously described crank arm 61 and is operatively connected by a pin 96' to a clevis 97' of a pull-rod 98' extending through a slot 99' of a vertical guide-plate 100' which are, respectively, similar to the previously described pin 96, clevis-fitting 97, pull-rod 98, slot 99, and guide-plate 100. The pull-rod 98' is provided at its outer end with a handle loop 101', an upstanding detent 102', and a bend-forming detent shoulder 103, all adapted for cooperation with a suitable pre-selector mechanism, such as the previously described pre-selector rail 110 and its associated elements.

Notched into the upper portion of the cross-member 378 adjacent its outer extremity and securely welded in place are longitudinally extending upwardly opening slide-channels 381 which are internally provided at suitably spaced intervals with rectangular slide-blocks 382 which are substantially similar to the previously described slide-blocks 42. It should be noted in this connection that, although only one such channel 381 is shown in FIG. 56, this figure merely illustrates one side of the structure. In other words, only one side of the load-equalizing device $D^5$ is illustrated in FIG. 56 and the other side is of similar and corresponding construction.

In the region of the cross-members 378, the horizontally extending bottom web 383 of the slide-channel 381 is provided with a rectangular opening 384 for receiving a vertically disposed section of heavy walled square tubing 385 having an outwardly presented lateral wall 386 which is cut away along its lower portion in the provision of a downwardly and laterally opening slot 387. Rigidly mounted at its ends in and extending lengthwise across the section of tubing 385 just below the upper end of the slot 387 is a journal pin 388 which rotatably supports an eccentric arcuate cam 389, the latter being welded to the side face of a locking-bar 390 which rocks in and out about the journal pin 389 in a lateral direction and is offset outwardly as at 391 to provide an upwardly extending vertical bar-shaped latch portion 392, one vertical side face of which is beveled as at 393, all as best seen in FIG. 60 and for purposes presently more fully appearing.

At its lower end, the locking-bar 390 extends somewhat inwardly through the slot 387 and is provided with an upwardly extending slot or bifurcation 394 having a transverse pin 395 which extends through an eye-fitting 396 which is provided at its inner end with an internally threaded sleeve portion 397 for receiving the threaded end 398 of a pull-rod 399 having a conventional lock-nut 400. The pull-rod 399 is substantially similar to the previously described pull-rod 71 and is similarly connected by means of a slot 401 and pin 402 to a diametrally extending rock-arm 403 pinned or otherwise suitably mounted on the shaft 379 and biased outwardly by a spring 404 which is substantially similar to the previously described spring 105.

Slidably mounted for vertical shifting movement within the section of tubing 385 is a rectilinear roller-carrier 405 having a flat horizontal bottom wall 406 which bears upon the arcuate cam 389. Internally, the roller-carrier 405 is provided with a transversely extending journal pin 407 which operatively supports a relatively large heavy roller 408, the latter projecting upwardly above the upper margins of the roller-carrier 407.

Provided for rigid securement, either by welding, riveting, or any other suitable structural method, along the under face of the truck-body adjacent the outer longitudinal margins thereof, are slide-rails 409 which are essentially of T-section integrally including a vertical rib 410 and a downwardly presented horizontal flange 411 which is relatively wide in the transverse direction and is provided along its outer margin with a plurality of suitably spaced indented U-shaped notches 412 of suitable dimension for embracingly fitting around and receiving the latch-portion 392 of the lock-bar 390. Welded or otherwise rigidly secured upon the under face of the flange 411 is a flat slide-bar 413 of slightly narrower width than the width of the slide-channel 381. The slide-bar 413 will normally fit down into the channel 381 and rest shiftably upon the slide-blocks 382. As previously noted, the spaces between the slide-blocks 382 can be provided with a suitable grease or other lubricant which will work its way up onto the flat horizontal top faces of the slide-blocks 382 and lubricate these surfaces. As will be seen in FIG. 57, when the latch-bar 380 is in locked position and the cam 389 is at its lowest position, the roller 408 will be located just below and out of contact with the under face of the slide-bar 413. Thus, when the shaft 379 is rotated, such movement will be transmitted through the pull-rod 389 to the locking-bar 390, swinging it out to the position shown in FIG. 58. In this position, the cam will elevate the roller 408 a sufficient distance so as to bear against the under face of the slide-bar 413 and elevate it from the surfaces of the slide-blocks 382 so as to permit longitudinal load-equalizing adjustment upon the roller 408. The locking-bar, meanwhile, will move outwardly away from engagement with the particular detent notch 412 in which it happened to be engaged so as to free the slide-rail 409 and the truck-body to which it is attached for load-equalizing longitudinal movement in relation to the slide-channel 381.

Welded upon the inner face of the upwardly projecting end of the bar-shaped latch portion 392 of the locking-bar 390 is a cross-bar 414 which projects horizontally outwardly on either side of the latch portion 392 so as to span any one of the detent notches 412 and, without interfering with longitudinal shifting movement for load-equalizing purposes, will, nevertheless, prevent vertical withdrawal of the truck-body and its associated slide-rails 409 completely from the slide-channel 381.

As described in connection with previous embodiments, further rocking movement of the shaft 389 will swing the locking-bar 390 outwardly to the position shown in FIG. 59 in which the cross-bar 414 is swung completely out of overlying alignment with the slide-rail 409 so as to permit the truck-body and its associated rails 409 to be completely lifted upwardly out of the slide-channels 381 for "pig-a-back" transportation whenever desired.

It should be noted that the pull-rod 98' and its associated parts function in conjunction with the pre-selector mechanism in exactly the same manner as described in connection with the previous embodiments.

It should be understood that changes and modifications in the form, construction, arrangement, and combination of the several parts of the load-carrying vehicles may be made and substituted for those herein shown and described without departing from the nature and principle of my invention.

Having thus described my invention, what I claim and desire to secure by Letters Patent is:

1. For use with a truck body having a plurality of transversely extending floor-sills, a load-equalizing device comprising a plurality of slide-rails adapted to be mounted on the under side of the floor-sills lengthwise of the truck body adjacent to the outer longitudinal side margins of the truck body, said rails each consisting of two spaced parallel horizontal members vertically connected by a plurality of spaced block-like elements forming a plurality of rectangular apertures, a plurality of transversely extending cross-sills having a length substantially equal to the transverse width of the truck body, longitudinally extending slide-channels mounted on and extending between the cross-sills adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, means for optionally elevating and lowering the auxiliary bearing means, and means for locking said slide-rails to the slide-channels in any one of a plurality of relatively shifted positions, said last-named means consisting of a plurality of pins which are located outwardly of said slide-rails when not in engagement therewith, said pins being rectangular in shape and having beveled inwardly presented faces.

2. For use with a truck body having a plurality of transversely extending floor-sills, a load-equalizing device comprising a plurality of slide-rails adapted to be mounted on the under side of the floor-sills lengthwise of the truck body adjacent to the outer longitudinal side margins of the truck body, said rails each consisting of two spaced parallel horizontal members vertically connected by a plurality of spaced block-like elements, a plurality of transversely extending cross-sills having a length substantially equal to the transverse width of the truck body, longitudinally extending slide-channels mounted on and extending between the cross-sills adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, means for optionally elevating and lowering the auxiliary bearing means, and locking means carried by the slide-channels for optional engagement in the spaces between the block-like elements.

3. For use with a truck body having a plurality of transversely extending floor-sills; a load-equalizing device comprising a plurality of slide-rails adapted to be mounted on the under side of the floor-sills lengthwise of the truck body adjacent to the outer longitudinal side margins of the truck body, said rails each consisting of upper and lower flat elongated plates secured together in vertically spaced relation by a plurality of lengthwise spaced blocks forming a plurality of rectangular apertures, a plurality of transversely extending cross-sills having a length substantially equal to the transverse width of the truck body, longitudinally extending slide-channels mounted on and extending between the cross-sills adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, means for optionally elevating and lowering the auxiliary bearing means, and means for locking said slide-rails to the slide-channels in any one of a plurality of relatively shifted positions, said last-named means consisting of a plurality of pins which are located outwardly of said slide-rails when not in engagement therewith.

4. For use with a truck body having a plurality of transversely extending floor-sills which are relatively deep in the vertical direction across the center and of reduced depth at their outer ends; a load-equalizing device comprising a plurality of slide-rails adapted to be mounted on the under side of the floor-sills lengthwise of the truck body adjacent to the outer longitudinal side margins of the truck body, the under faces of said rails being above the plane of the central portion of the sills, said rails each consisting of upper and lower flat elongated plates secured together in vertically spaced relation by a plurality of lengthwise spaced blocks forming a plurality of rectangular apertures, a plurality of transversely extending cross-sills having a length substantially equal to the transverse width of the truck body, longitudinally extending slide-channels mounted on and extending between the cross-sills adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted when in upwardly shifted position, for lifting the slide-rails and supporting them for longitudinal shifting movement, means for optionally elevating and lower the auxiliary bearing means, and means for locking said slide-rails to the slide-channels in any one of a plurality of relatively shifted positions, said last-named means consisting of a plurality of pins which are located outwardly of said slide-rails when not in engagement therewith.

5. For use with a truck body having a plurality of transversely extending floor-sills; a load-equalizing device comprising a plurality of slide-rails adapted to be mounted on the under side of the floor-sills lengthwise of the truck body adjacent to the outer longitudinal side margins of the truck body, said rails having downwardly presented flat slide-faces, a plurality of transversely extending cross-sills having a length substantially equal to the transverse width of the truck body, longitudinally extending upwardly opening U-shaped slide-channels mounted on and extending between the cross-sills adjacent the outer ends thereof in vertical alignment with the slide-rails, said slide-channels being wider than the slide-faces of the slide-rails so that the slide-rails will extend down into the slide-channels, slide bearing means mounted in the slide-channels and having co-planar top surfaces located below the plane of the upper margins of the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, means for optionally elevating and lowering the auxiliary bearing means, locking means for holding the rails partially within the channels while the latter are in upwardly shifted position whereby to permit longitudinal shifting movement of the slide-rails within the slide-channels while preventing complete disengagement between the slide-rails and slide-channels, and means operatively associated with said last-named means to permit complete disengagement between the slide-rails and slide-channels.

6. For use with a truck body having a plurality of transversely extending floor-sills; a load-equalizing device comprising a plurality of slide-rails adapted to be mounted on the under side of the floor-sills lengthwise of the truck body adjacent to the outer longitudinal side margins of the truck body, said rails having downwardly presented flat slide-faces, a plurality of transversely extending cross-sills having a length substantially equal to the transverse width of the truck body, longitudinally extending upwardly opening U-shaped slide-channels mounted on and extending between the cross-sills adjacent the outer ends thereof in vertical alignment with the slide-rails, said slide-channels being wider than the slide-faces of the slide-rails so that the slide-rails will extend down into the slide-channels, slide bearing means mounted in the slide-channels and having co-planar top surfaces located below the plane of the upper margins of the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, means for optionally elevating and lowering the auxiliary bearing means, locking means for holding the rails partially within the channels while the latter are in upwardly shifted position whereby to permit longitudinal shifting movement of the slide-rails within the slide-channels while preventing complete disengagement between the slide-rails and slide-channels, and means for entirely withdrawing the locking means whereby to permit disengagement between the slide-rails and the slide-channels.

7. In combination with a truck body and a tandem-axle, a load-equalizing device comprising a pair of slide-rails mounted on the under side of the truck body adjacent to the outer longitudinal side margins thereof, transversely extending frame-means mounted on the tandem-axle, said frame-means having a width substantially equal to the transverse width of the truck body, longitudinally extending slide-channels mounted on the frame-means adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, means for optionally elevating and lowering the auxiliary bearing means, means for optionally locking the slide-rails to the slide-channels in any one of a plurality of relatively shifted longitudinal positions, means for partially disengaging the locking means to permit longitudinal adjustment between the slide-rails and the slide-channels, and means for completely disengaging the locking means to permit complete disengagement between the slide-rails and slide-channels.

8. For use with a truck body having a plurality of transversely extending floor-sills; a load-equalizing device comprising a plurality of T-shaped slide-rails adapted to be mounted on the under side of the floor-sills lengthwise of the truck body adjacent to the outer longitudinal side margins of the truck body, each having a horizontal flange provided along its longitudinal margins with a plurality of laterally opening recesses, a plurality of transversely extending cross-sills having a length substantially equal to the transverse width of the truck body, longitudinally extending slide-channels mounted on and extending between the cross-sills adjacent the outer ends thereof in vertical alignment with the slide-rails, slide bearing means carried by the slide-channels for sliding supportive engagement with the slide-rails, locking bars mounted for lateral rocking movement upon longitudinally extending horizontal pins for optional engagement within any one of the recesses for locking the slide-rails to the slide-channels in any one of a plurality of relatively shifted longitudinal positions, roller means mounted on the slide channels for vertical movement in relation thereto, and cam means on the locking bars for elevating the rollers into load-supportive engagement with the slide-rails.

9. For use with a truck body having a plurality of transversely extending floor-sills; a load-equalizing device comprising a plurality of T-shaped slide-rails adapted to be mounted on the under side of the floor-sills lengthwise of the truck body adjacent to the outer longitudinal side margins of the truck body, each having a horizontal flange provided along its longitudinal margins with a plurality of laterally opening recesses, a plurality of transversely extending cross-sills having a length substantially equal to the transverse width of the truck body, longitudinally extending slide-channels mounted on and extending between the cross-sills adjacent the outer ends thereof in vertical alignment with the slide-rails, slide bearing means carried by the slide-channels for sliding supportive engagement with the slide-rails, locking bars mounted for lateral rocking movement upon longitudinally extending horizontal pins for optional engagement within any one of the recesses for locking the slide-rails to the slide-channels in any one of a plurality of relatively shifted longitudinal positions, roller means mounted on the slide channels for vertical movement in relation thereto, cam means on the locking bars for elevating the rollers into load-supportive engagement with the slide-rails, and pull-rod means for actuating the locking bars.

10. For use with a truck body having a plurality of transversely extending floor-sills; a load-equalizing device comprising a plurality of T-shaped slide-rails adapted to be mounted on the under side of the floor-sills lengthwise of the truck body adjacent to the outer longitudinal side margins of the truck body, each having a horizontal flange provided along its longitudinal margins with a plurality of laterally opening recesses, a plurality of transversely extending cross-sills having a length substantially equal to the transverse width of the truck body, longitudinally extending slide-channels mounted on and extending between the cross-sills adjacent the outer ends thereof in vertical alignment with the slide-rails, slide bearing means carried by the slide-channels for sliding supportive engagement with the slide-rails, locking bars mounted for lateral rocking movement upon longitudinally extending horizontal pins for optional engagement within any one of the recesses for locking the slide-rails to the slide-channels in any one of a plurality of relatively shifted longitudinal positions, roller means mounted on the slide channels for vertical movement in relation thereto, cam means on the locking bars for elevating the rollers into load-supportive engagement with the slide-rails, and auxiliary locking elements adapted for overlying disposition above the horizontal flanges of the T-shaped slide-rails for retaining said slide-rails within the slide-channels even when the locking bars are swung outwardly into unlocked position.

11. For use with a truck body having a plurality of transversely extending floor-sills; a load-equalizing device comprising a plurality of rails adapted to be mounted on the under side of the floor-sills lengthwise of the truck body adjacent to the outer longitudinal side margins of the truck body, a frame having a width substantially equal to the transverse width of the truck body, longitudinally extending slide-channels mounted on the frame adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, actuating means operatively mounted on said frame, wedge means operatively connected to said actuating means for optionally elevating and lowering the auxiliary bearing means, pneumatic means consisting of at least one double-acting movable pneumatic cylinder having two opposed chambers, a piston and a piston rod operatively mounted in each chamber, one piston rod being attached to the frame, the other piston rod being attached to the actuating means, and means for controllably admitting air under pressure to each chamber.

12. For use with a truck body having a plurality of transversely extending floor-sills; a load-equalizing device comprising a plurality of rails adapted to be mounted on the under side of the floor-sills lengthwise of the truck body adjacent to the outer longitudinal side margins of the truck body, a frame having a width substantially equal to the transverse width of the truck body, longitudinally extending slide-channels mounted on the frame adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, actuating means operatively mounted on said frame, wedge means operatively connected to said actuating means for optionally elevating and lowering the auxiliary bearing means, fluid-operated means consisting of at least one double-acting movable fluid-operated cylinder having two opposed chambers, a piston and a piston rod operatively mounted in each chamber, one piston rod being attached to the frame, the other piston rod being attached to the actuating means, means for controllably admitting fluid under pressure to each chamber, and means for optionally locking the slide-rails to the slide-channels in any one of a plurality of relatively shifted longitudinal positions, said locking means being operatively connected to said wedge means and actuated when said wedge means is actuated.

13. For use with a truck body having a plurality of transversely extending floor-sills; a load-equalizing device comprising a plurality of rails adapted to be mounted on the underside of the floor-sills lengthwise of the truck body adjacent to the outer longitudinal side margins of the truck body, a frame having a width substantially equal to the transverse width of the truck body, longitudinally extending slide-channels mounted on the frame adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, actuating means for optionally elevating and lowering the auxiliary bearing means, pneumatic means consisting of at least one double-acting movable pneumatic cylinder having two opposed chambers, a piston and a piston rod operatively mounted in each chamber, one piston rod being attached to the frame, the other piston rod being attached to the actuating means, valve means for controllably admitting air under pressure to each chamber, said valve means having manually operable handles adapted to be shifted optionally into either of two positons, pre-selector means for returning at least one of said handles from one of its positions to another position responsive to sliding movement of the slide-rails relative to the slide -channels, and means operatively connected to said pneumatic means for optionally locking the slide-rails to the slide-channels in any one of a plurality of relatively shifted longitudinal positions, said last-named means also being controlled by said valve means, one of said handles being adapted to regulate the sliding movement of the slide-rails and the other of said handles being adapted to cause complete disengagement of said slide-rails and slide-channels.

14. For use with a truck body having a plurality of transversely extending floor-sills; a load-equalizing device comprisng a plurality of rails adapted to be mounted on the under side of the floor-sills lengthwise of the truck body adjacent to the outer longitudinal side margins of the truck body, a frame having a width substantially equal to the transverse width of the truck body, longitudinally extending slide-channels mounted on the frame adjacent the outer ends thereof in vertical alignment with the slide-rails, slide bearing means carried by the slide-channels for sliding supportive engagement with the slide-rails, auxiliary bearing means mounted on the slide-channels for upward shifting movement in relation thereto, and being adapted, when in upwardly shifted position, for lifting the slide-rails and supporting them for longitudinal shifting movement, actuating means operatively mounted on said frame, wedge means operatively connected to said actuating means for optionally elevating and lowering the auxiliary bearing means, pneumatic means consisting of a plurality of double-acting movable pneumatic cylinders each having two opposed chambers, a piston and a piston rod operatively mounted in each chamber, one piston rod being attached to the frame, the other piston rod being attached to the actuating means, means for controllably admitting air under pressure to each chamber, and means for optionally locking the slide-rails to the slide-channels in any one of a plurality of relatively shifted longitudinal positions.

15. For use with a truck body having a plurality of transversely extending floor-sills which are relatively deep in the vertical direction across the center and of reduced depth at their outer ends; a load-equalizing device comprising a plurality of slide-rails adapted to be mounted on the under side of the floor-sills lengthwise of the truck body adjacent to the outer longitudinal side margins of the truck body, the under faces of said rails being above the plane of the central portion of the sills, said rails each consisting of upper and lower flat elongated plates secured together in vertically spaced relation by a plurality of lengthwise spaced blocks forming a plurality of rectangular apertures, horizontally shiftable bars optionally engageable with any one of said apertures for locking the slide-rails to the slide-channels in any one of a plurality of relatively shifted longitudinal positions, said bars being positioned outwardly of said slide rails when not in engagement therewith, a plurality of transversely extending cross-sills having a length substantially equal to the transverse width of the truck body, longitudinally extending slide-channels mounted on and extending between the cross-sills adjacent the outer ends thereof in vertical alignment with the slide rails, and slide bearing means carried by the slide-channels for sliding supportive engagement with the slide-rails.

16. For use with a truck body having a plurality of transversely extending floor-sills; a load-equalizing device comprising a plurality of slide-rails adapted to be mounted on the under side of the floor-sills lengthwise of the truck body adjacent to the outer longitudinal side margins of the truck body, said rails having downwardly presented flat slide-faces, a plurality of transversely extending cross-sills having a length substantially equal to the transverse with of the truck body, longitudinally extending upwardly opening U-shaped slide-channels mounted on and extending between the cross-sills adjacent the outer ends thereof in vertical alignment with the slide-rails, said slide-channels being wider than the slide-faces of the slide-rails so that the slide-rails will extend down into the slide-channels, slide-bearing means mounted in the slide-channels and having co-planar top surfaces located below the plane of the upper margins of the slide-channels for sliding supportive engagement with the slide-rails, locking means consisting of a plurality of horizontally shiftable bars, said shiftable bars being located at a first position outwardly of said slide-rails when said slide-rails are capable of longitudinal shifting movement, and means for positioning said bars to a second position spaced outwardly from said first-named position whereby to permit disengagement between the slide-rails and the slide-channels.

17. For use with a truck body having a plurality of transversely extending floor-sills; a load-equalizing device comprising a plurality of slide-rails adapted to be mounted on the under side of the floor-sills lengthwise of the truck body adjacent to the outer longitudinal side margins of the truck body, said rails having downwardly presented flat slide-faces, a plurality of transversely extending cross-sills having a length substantially equal to the transverse width of the truck body, longitudinally extending upwardly opening U-shaped slide-channels mounted on and extending between the cross-sills adjacent the outer ends thereof in vertical alignment with the slide-rails, said slide-channels being wider than the slide-faces of the slide-rails so that the slide-rails will extend down into the slide-channels, slide bearing means mounted in the slide-channels and having co-planar top surfaces located below the plane of the upper margins of the slide-channels for sliding supportive engagement with the slide-rails, and locking means consisting of a plurality of horizontal shiftable bars for holding the rails partially within the channels whereby to permit longitudinal shifting movement of the slide-rails within the slide-channels while preventing complete disengagement between the slide rails and slide-channels, said shiftable bars being positioned outwardly of said slide-rails when the slide-rails are capable of longitudinal shifting movement.

References Cited in the file of this patent

UNITED STATES PATENTS

| | | |
|---|---|---|
| 1,303,854 | Clark | May 20, 1919 |
| 2,021,503 | Fildes | Nov. 19, 1935 |
| 2,388,283 | Porter | Nov. 6, 1945 |
| 2,589,678 | De Lay | Mar. 18, 1952 |

(Other references on following page)

UNITED STATES PATENTS

| | | |
|---|---|---|
| 2,831,735 | Bennett | Apr. 22, 1958 |
| 2,835,504 | Acker | May 20, 1958 |
| 2,900,194 | De Lay | Aug. 18, 1959 |
| 2,935,332 | De Lay | May 3, 1960 |
| 2,942,912 | Lucas et al. | June 28, 1960 |
| 2,962,295 | Tenenbaum | Nov. 29, 1960 |
| 2,993,728 | Beran et al. | July 25, 1961 |
| 3,004,772 | Bohlen et al. | Oct. 17, 1961 |
| 3,011,665 | Wise | Dec. 5, 1961 |